US010348220B2

(12) United States Patent
Kurosawa et al.

(10) Patent No.: US 10,348,220 B2
(45) Date of Patent: Jul. 9, 2019

(54) THREE-PHASE MOTOR CONTROLLING SYSTEM FOR DATA STORAGE DEVICE

(71) Applicant: Renesas Electronics Corporation, Tokyo (JP)

(72) Inventors: Minoru Kurosawa, Tokyo (JP); Seigi Ishiji, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/004,494

(22) Filed: Jun. 11, 2018

(65) Prior Publication Data
US 2019/0006964 A1 Jan. 3, 2019

(30) Foreign Application Priority Data

Jun. 28, 2017 (JP) ................... 2017-126500

(51) Int. Cl.
| | |
|---|---|
| *G11B 19/20* | (2006.01) |
| *H02P 3/12* | (2006.01) |
| *H02P 7/025* | (2016.01) |
| *H02P 7/293* | (2016.01) |
| *H02P 29/68* | (2016.01) |
| *H02P 7/29* | (2016.01) |
| *G11B 19/28* | (2006.01) |
| *G11B 5/54* | (2006.01) |
| *G11B 15/46* | (2006.01) |

(52) U.S. Cl.
CPC ............ *H02P 3/12* (2013.01); *G11B 19/2009* (2013.01); *H02P 7/025* (2016.02); *H02P 7/29* (2013.01); *H02P 7/293* (2016.02); *H02P 29/68* (2016.02); *G11B 5/54* (2013.01); *G11B 15/46* (2013.01); *G11B 19/28* (2013.01)

(58) Field of Classification Search
None
See application file for complete search history.

(56) References Cited

U.S. PATENT DOCUMENTS 5,455,496 A * 10/1995 Williams ................. G05B 9/02
318/563
5,847,521 A * 12/1998 Morikawa ............... H02P 6/085
318/400.01
(Continued)

FOREIGN PATENT DOCUMENTS

| JP | 2004-297904 A | 10/2004 |
|---|---|---|
| JP | 2017-85799 A | 5/2017 |

*Primary Examiner* — Tan X Dinh
(74) *Attorney, Agent, or Firm* — McDermott Will & Emery LLP

(57) ABSTRACT

A PWM modulation circuit controls low-side transistors of three phases to all be in an ON state when a brake current flows; controls, in a period in which a brake current flows in a first direction in one phase, a transistor for sensing in that one phase to be in an ON state; and controls, in a period in which a brake current flows in the first direction in two phases, transistors for three phases to be in an OFF state. When the brake current is to flow, sense-phase control circuits for the three phases control a transistor for sensing, in a phase in which the brake current flows in a sink direction, to be into an ON state, and controls the transistor for sensing in a phase in which the brake current flows in an opposite direction, to be into an OFF state.

20 Claims, 20 Drawing Sheets

(56) References Cited

U.S. PATENT DOCUMENTS

| | | | | |
|---|---|---|---|---|
| 6,188,192 B1* | 2/2001 | Chen | ............... | G11B 21/12 |
| | | | | 318/377 |
| 6,285,521 B1* | 9/2001 | Hussein | ............ | G11B 15/46 |
| | | | | 360/73.03 |
| 6,396,652 B1* | 5/2002 | Kawachi | ............ | G11B 5/54 |
| | | | | 360/73.03 |
| 6,998,801 B2* | 2/2006 | Kurosawa | ............ | H02P 6/28 |
| | | | | 318/400.27 |
| 7,054,089 B2* | 5/2006 | Kokami | ............ | G11B 5/54 |
| | | | | 360/70 |
| 7,119,508 B2 | 10/2006 | Kurosawa et al. | | |
| 7,649,330 B2* | 1/2010 | Yamashita | ........... | G11B 5/54 |
| | | | | 318/400.34 |
| 7,902,775 B2* | 3/2011 | Narumi | ............ | H02P 6/182 |
| | | | | 318/400.04 |
| 8,963,452 B2* | 2/2015 | Otaguro | ............ | G11B 19/28 |
| | | | | 318/3 |
| 8,970,139 B2* | 3/2015 | Otaguro | ............ | G11B 19/28 |
| | | | | 318/3 |
| 9,052,344 B2* | 6/2015 | Yoshiya | ............ | G01R 19/30 |
| 9,093,106 B2* | 7/2015 | Otaguro | ............ | G11B 19/28 |
| 9,355,676 B1* | 5/2016 | Nicholls | ............ | H02P 3/14 |
| 9,503,011 B2* | 11/2016 | Kurosawa | ......... | H02P 23/0077 |
| 10,056,107 B2* | 8/2018 | Kurosawa | ......... | G11B 19/2063 |
| 2017/0126155 A1 | 5/2017 | Kurosawa et al. | | |

* cited by examiner

ONE-PHASE (U-PHASE) SINK PERIOD

TWO-PHASE (V, W-PHASE) SINK PERIOD

THREE-PHASE MOTOR CONTROLLING SYSTEM FOR DATA STORAGE DEVICE

CROSS-REFERENCE TO RELATED APPLICATIONS

The disclosure of Japanese Patent Application No. 2017-126500 filed on Jun. 28, 2017 including the specification, drawings and abstract is incorporated herein by reference in its entirety.

BACKGROUND

The present disclosure relates to a motor driving device and a motor system, and relates, for example, to a braking technique at the time of stopping the rotation of a motor.

Japanese Unexamined Patent Application Publication No. 2004-297904 discloses a direct current motor driving system which can detect a current flowing through a coil without using a shunt resistor. Specifically, there are provided MOS transistors for current detection, in a manner corresponding to output MOS transistors of phases of the low side. The source and the gate of the MOS transistor for current detection of each phase are coupled respectively to the source and the gate of the output MOS transistor of a corresponding phase.

Japanese Unexamined Patent Application Publication No. 2017-85799 discloses a motor driving device which drives a three-phase motor using a sine wave. In this motor driving device, one cycle (an electrical angle of 360 degrees) of the sine wave is divided into periods of 60 degrees, a terminal voltage of one phase of the three phases is fixed to a power supply voltage or a ground power supply voltage, in each period, and terminal voltages of the remaining two phases are controlled by a PWM signal.

SUMMARY

For example, in a motor system, such as a hard disk drive (in this specification, referred to as HDD), it is demanded to realize acceleration of the motor rotation and to increase the efficiency (that is, to reduce power loss), in accordance with the large capacity and the acceleration. For these demands, it is advantageous to reduce on-resistance of driving transistors driving the motor or coil resistance of the motor, or to increase the torque constant.

In an emergency, such as power interruption, it is necessary to safely and quickly stop the motor. A known system, as a system for stopping the motor, is a short brake which controls the driving transistors (in this specification, called as high-side transistors) on the power supply voltage side to be in an OFF state, and controls the driving transistors (in this specification, called as low-side transistors) on the ground power supply voltage side to be in an ON state. By performing the short brake, a brake current flows between the low-side transistors and the motor. Thus, a counter electromotive voltage of the motor is consumed, thereby enabling to quickly stop the motor.

However, as described, the brake current at the time of short brake increases, as the on-resistance of the driving transistor or the coil resistance of the motor decreases, or as the counter electromotive voltage increases as a result of an increase in the torque constant. As a result, for example, an operating point of the driving transistor deviates from an ASO (Area of Safety Operation), including the maximum rated current, the maximum rated voltage, and the maximum temperature, thereby undesirably lowering the safety.

Preferred embodiments as will be described later have been made to solve the above problem, any other objects and new features will be apparent from the descriptions of this specification and the accompanying drawings.

According to one embodiment, there is provided a motor driving device driving a three-phase motor which is externally provided. The device includes drivers of three phases which include high-side transistors of three phases and low-side transistors of three phases, current sense circuits of three phases, sense-phase control circuits of three phases, and a PWM modulation circuit which controls the drivers of three phases and the current sense circuits of three phases. Each of the current sense circuits of three phases includes first transistors which are coupled between the motor driving node of a corresponding phase and the current detection node, a second transistor which is coupled between the current detection node and the low potential-side power supply voltage, and fixed into an ON state, and third transistors which are coupled between the current detection node and the low potential-side power supply voltage. In a first operation mode for causing a brake current to flow through the drivers of three phases, the sense-phase control circuits of three phases control the first transistor of a phase, in which the brake current flows in a direction (first direction) from the motor driving node to a low potential-side power supply voltage, to be into an ON state, and control the first transistor of a phase in which it flows in an opposite direction, to be into an OFF state. The PWM modulation circuit, in the first operation mode, controls the low-side transistors of three phases, to be all into an ON state, and controls, in a period in which the brake current flows in the first direction in one phase, only the third transistor of the one phase to be into an ON state, and controls the three transistors of three phases all to be into an OFF state, in a period in which it flows in the first direction in two phases.

According to the one embodiment, it is possible to detect a brake current at the time of short braking.

DETAILED DESCRIPTION

Figure 1:
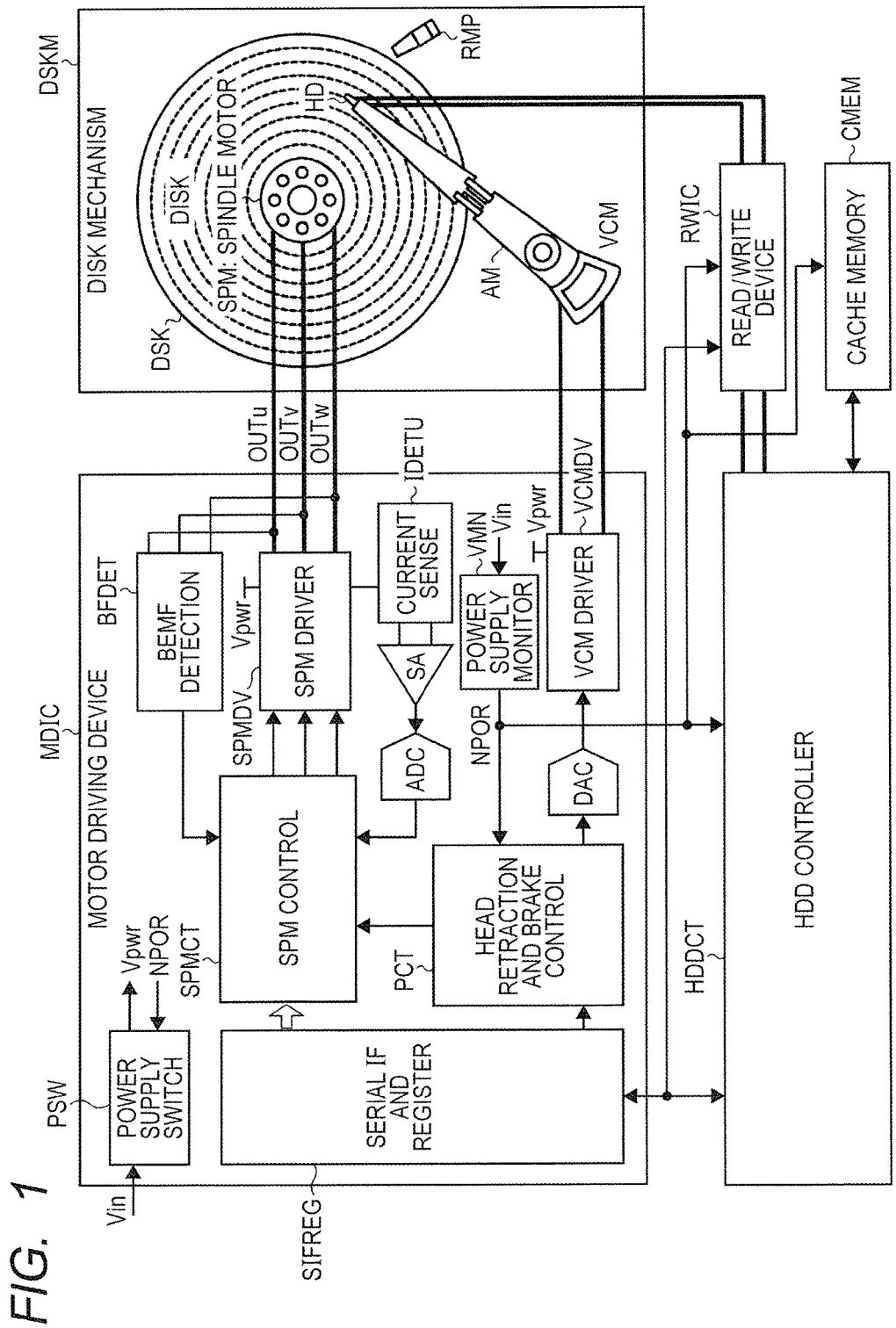
FIG. 1 is a functional block diagram illustrating a schematic configuration example of a motor system according to a first embodiment of the present invention.

In the following preferred embodiments, if necessary for convenience sake, descriptions will be made to divided plural sections or preferred embodiments, however, unless otherwise specified, they are not mutually irrelevant, but one is in relations of modifications, details, supplementary explanations of a part or whole of the other. In the following preferred embodiments, in the case of reference to the number of elements (including the quantity, numeric value, amount, range), unless otherwise specified and unless clearly limited in principle, the present invention is not limited to the specified number, and a number over or below the specified one may be used.

Further, in the following preferred embodiments, the constituent elements (including the element steps) are not necessarily indispensable, unless otherwise specified and unless considered that they are obviously required in principle. Similarly, in the following preferred embodiments, in the reference of the forms of the constituent elements or the positional relationships, they intend to include those approximating or similar substantially to the forms and like, unless otherwise specified and unless considered that they are obviously not required in principle. This is also true of the foregoing numerical values and the range.

Though no particular restriction is made, circuit elements included in each functional block of the preferred embodiments are formed on a semiconductor substrate, like single crystal silicon, using an integrated circuit technology, such as a well-known CMOS (Complementary MOS transistor).

In this specification, the n-channel type MOSFET (Metal Oxide Semiconductor Field Effect Transistor) is referred to as nMOS transistor, while the p-channel type MOSFET (Metal Oxide Semiconductor Field Effect Transistor) is referred to as a pMOS transistor.

Descriptions will now specifically be made to the preferred embodiments of the present invention based on the illustrations. In the drawings below for explaining the preferred embodiments, the same constituent elements are identified by the same reference symbols, and thus may not be described over and over as needed.

First Embodiment

<Scheme of Motor System>

FIG. 1 is a functional block diagram illustrating a schematic configuration example of a motor system according to a first embodiment of the present invention. FIG. 1 illustrates a configuration example of a hard disk drive (in this specification, referred to as HDD), as an example of the motor system. The HDD of FIG. 1 includes an HDD controller HDDCT, a cache memory CMEM, a read/write device RWIC, a motor driving device MDIC, and a disk mechanism DSKM. The HDD controller HDDCT is configured with a system-on-chip (SoC) including, for example, a processor. The cache memory CMEM and the read/write device RWIC are configured with, for example, different semiconductor chips.

The disk mechanism includes a disk (in this case, a hard disk) DSK, a three-phase spindle motor (hereinafter referred to as a motor) SPM, ahead HD, an arm mechanism AM, a voice coil motor VCM, and a ramp mechanism RMP. The motor SPM rotationally drives the disk DSK. The voice coil motor VCM controls the position of the head HD in a radial direction of the disk DSK through the arm mechanism AM. The head HD reads data from the disk DSK or writes data onto the disk DSK, in a predetermined position which is determined by the voice coil motor VCM. The RAM mechanism RMP is a retraction area for the head HD, when reading and writing of data is not performed.

The motor driving device MDIC is configured, for example, with one semiconductor chip. The motor driving device MDIC includes a digital/analog converter DAC and a VCM driver VCMDV, to drive the voice coil motor VCM. The motor driving device MDIC includes an SPM control circuit SPMCT, an SPM driver SPMDV, a current sense circuit unit IDETU, a sense amplifier circuit SA, an analog/digital converter ADC, and a counter electromotive voltage (in this specification, called as a BEMF) detection circuit BFDET, to drive the motor SPM.

Further, the motor driving device MDIC includes, as a common circuit of the motor SPM and the voice coil motor VCM, a power supply monitor circuit VMN, a power supply switch PSW, a serial IF & register circuit SIFREG, and a post control circuit PCT. The power supply switch PSW connects an external power supply voltage Vin to an internal power supply voltage (high potential-side power supply voltage) Vpwr in a conduction state, and disconnects the internal power supply voltage Vpwr from the external power supply voltage Vin in an insulating state. Each circuit in the motor driving device MDIC is operated in accordance with the internal power supply voltage Vpwr.

The power supply monitor circuit VMN monitors the external power supply voltage Vin, and outputs a reset signal NPOR, when power interruption of the external power supply voltage Vin is detected. The power supply switch PSW is controlled to be from the conduction state to the insulating state, in accordance with this reset signal NPOR. The serial IF & register circuit SIFREG sets the driving condition of the motor SPR or the voice coil motor VCM, in accordance with an external input. The post control circuit PCT controls various sequences, such as retraction of the head HD or short braking of the motor SPM, that are necessary at the time of power interruption, in accordance with the reset signal NPOR from the power supply monitor circuit VMN.

The read/write device RWIC drives the head HD to control the head HD to perform reading/writing of data. The HDD controller HDDCT controls the entire HDD device. The HDD controller HDDCT performs communication, for example, with the serial IF & register unit SIFREG of the motor driving device MDIC, thereby instructing the motor driving device MDIC about the driving condition of the motor SPM or the voice coil motor VCM. The HDD controller HDDCT instructs, for example, the read/write device RWIC to perform reading/writing of data. At this time, the write data in accordance with the instruction given to the read/write device RWIC or the data read from the head HDD to the read/write device RWIC is held in the cache memory CMEM.

Descriptions will now briefly be made to an operation of this HDD. When an activation instruction of the motor SPM is received from the HDD controller HDDCT, the motor driving device MDIC drives the motor SPM through the SPM driver SPMDV, using a PWM (Pulse Width Modulation) signal generated by the SPM control circuit SPMCT. At this time, the current sense circuit unit IDETU detects a driving current flowing through the SPM driver SPMDV (that is, the motor SPM as well). The detected driving current is amplified by the sense amplifier circuit SA, and converted in a digital value by the analog/digital converter ADC. The SPM control circuit SPMCT generates a PWM signal for reducing an error between a current detection value (a digital value) of the driving current and a current instruction value as a target value of the driving current. The current instruction value is instructed, for example, by the HDD controller HDDCT.

The BEMF detection circuit BFDET detects a counter electromotive voltage (BEMF) of the motor SPM, thereby detecting the rotational position of the motor SPM. The SPM control circuit SPMCT outputs a PWM signal for approximating the value of the driving current of the motor SPM to the current instruction value to the SPM driver SPMDV, at an appropriate timing corresponding to the rotational position of this motor SPM. As a result of this, the motor SPM (that is, the disk DSK) is controlled into a rated rotation state. After the motor SPM reaches the rated rotation state, the VCM driver VCMDV controls the head HD to move onto the disk DSK. Then, the head HD reads and writes data on the disk DSK.

At the time of power interruption of the external power supply voltage Vin, the power supply monitor circuit VMN outputs a reset signal NPOR. In response to this, the HDD controller HDDCT, the read/write device RWIC, and the cache memory CMEM are reset. Further, as described above, because the power supply switch PSW is controlled to be in the insulating state, the internal power supply voltage Vpwr can be held by the rotation energy of the motor SPM. The post control circuit PCT instructs the VCM driver VCMDV on a current value through the digital/analog converter DAC. Then, the VCM driver VCMDV drives the voice coil motor VCM using the instructed current value. As a result, the post control circuit PCT controls the head HD to be retracted to the ramp mechanism RMP.

After the retraction of the head HD is completed, the post control circuit PCT instructs the SPM control circuit SPMCT to stop the motor SPM (that is, execution of short braking). At this time, as described above, a brake current flowing through the driving transistor (that is, the motor SPM as well) tends to increase, as the on-resistance of each driving transistor in the SPM driver SPMDV is decreased, as the resistance of the coil of the motor SPM is decreased, or as the amplitude of the counter electromotive voltage (BEMF) is increased. As a result, for example, an operating point of the driving transistor deviates from the area of safety operation (ASO), thereby fearfully lowering the safety. It is therefore advantageous to use a motor driving device according to the first embodiment, as will be described later.

<Schematic Configuration and Schematic Operation of Motor Driving Device (Comparative Example)>

Figure 14:
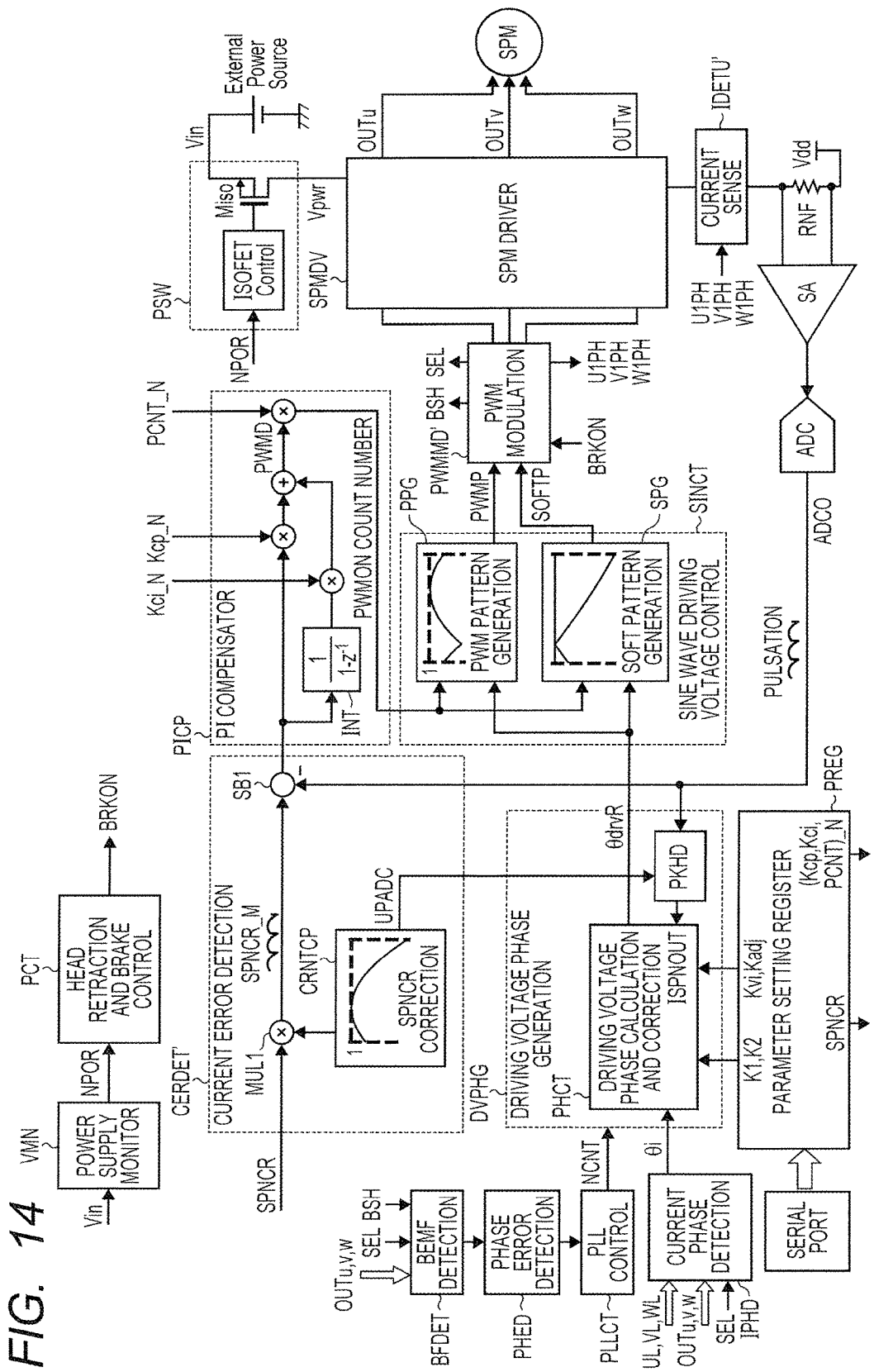
FIG. 14 is a functional block diagram illustrating a configuration example of the main part of a motor driving device as a comparative example of the present invention.
Figure 15:
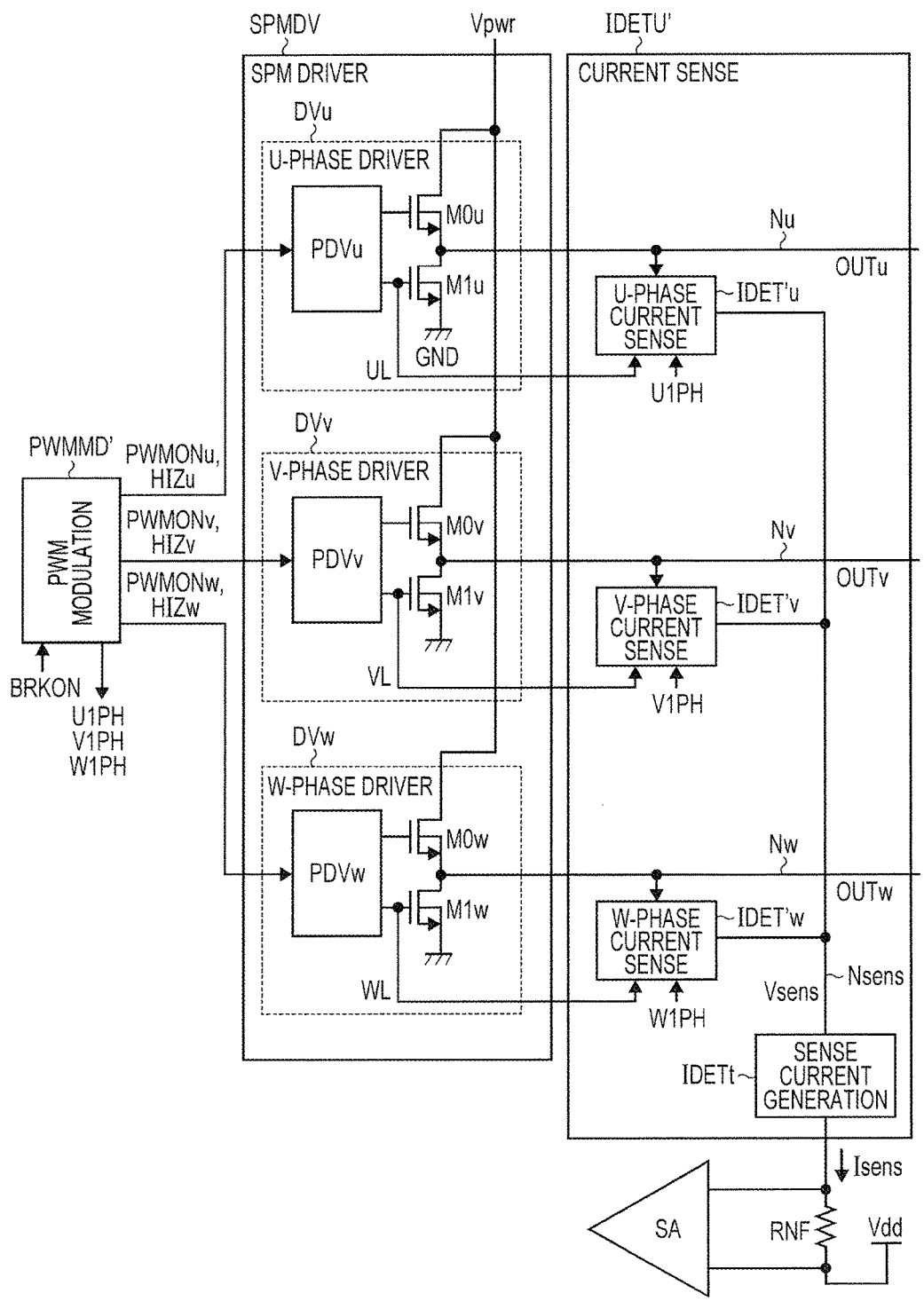
FIG. 15 is a circuit block diagram illustrating a configuration example around an SPM driver and a current sense circuit in FIG. 14.

Prior to description of the motor driving device of the first embodiment, descriptions will now be made to a motor driving device which has been examined as a comparative example. FIG. 14 is a functional block diagram illustrating a configuration example of the main part of the motor driving device as the comparative example of the present invention. FIG. 15 is a circuit block diagram illustrating a configuration example around the SPM driver and the current sense circuit in FIG. 14. FIG. 14 illustrates a circuit, excluding the VCM driver VCMDV and the digital/analog converter DAC, in the motor driving device MDIC of FIG. 1. It also illustrates a current detecting resistor RNF and the motor SPM provided outside the motor driving device MDI.

In FIG. 15, the SPM driver SPMDV includes drivers of three phases, such as a u-phase driver DVu, a v-phase driver DVv, and a w-phase driver DVw. The drivers (DVu, DVv, and DVw) of three phases include high-side transistors M0$u$, M0$v$, and M0$w$ of three phases and low-side transistors M1$u$, M1$v$, and M1$w$ of three phases. The high-side transistors M0$u$, M0$v$, and M0$w$ of three phases are coupled respectively between the internal power supply voltage (high potential-side power supply voltage) Vpwr and motor driving nodes Nu, Nv, and Nw of three phases. The low-side transistors M1$u$, M1$v$, and M1$w$ of three phases are coupled between a ground power supply voltage (a low potential-side power supply voltage) GND and the motor driving nodes Nu, Nv, and Nw of three phases. Each of the high-side transistors M0$u$, M0$v$, and M0$w$ and the low-side transistors M1$u$, M1$v$, and M1$w$ is, for example, an nMOS transistor.

The u-phase driver DVu, the v-phase driver DVv, and the w-phase driver DVw respectively include a u-phase pre-driver PDVu, a v-phase pre-driver PDVv, and a w-phase pre-driver PDVw. The u-phase pre-driver PDVu complementarily drives the high-side transistor M0$u$ and the low-side transistor Miu using a PWM signal, in accordance with a u-phase PWM ON signal PWMONu from a PWM conversion circuit PWMMD'. The u-phase pre-driver PDVu drives the high-side transistor M0$u$ and the low-side transistor M1$u$ into an OFF state, in accordance with a u-phase high impedance signal HIZu from the PWM conversion circuit PWMMD', and controls the motor driving node Nu to be in a high impedance state. The high impedance signal HIZu is used at the time of detecting, for example, a u-phase BEMF.

Similarly, the v-phase pre-driver PDVv appropriately controls the high-side transistor M0$v$ and the low-side transistor M1$v$, in accordance with a v-phase PWM ON signal PWMONv and a v-phase high impedance signal HIZv from the PWM modulation circuit PWMMD'. The w-phase pre-driver PDVw also appropriately controls the high-side transistor M0w and the low-side transistor M1w, in accordance with a w-phase PWMON signal PWMONw and a w-phase high impedance signal HIZw from the PWM modulation circuit PWMMD'.

The drivers (DVu, DVv, DVw) of three phases respectively generate output signals OUTu, OUTv, and OUTw of three phases for the motor driving nodes Nu, Nv, and Nw, in accordance with the phase PWM ON signals PWMON (u, v, and w). The output signals OUTu, OUTv, and OUTw of three phases are PWM signals in a short period of time, but are sine wave voltages of three phases in an averaged time.

The current sense circuit unit IDETU' includes current sense circuits of three phases and a sense current generation circuit IDETt. The current sense circuits of three phases include a u-phase current sense circuit IDET'u, a v-phase current sense circuit IDET'v and a w-phase current sense circuit IDET'w. Input to the current sense circuits IDET'u, IDET'v, and IDET'w of three phases are output signals OUTu, OUTv, and OUTw of three phases, gate control signals (that is, PWM signals) UL, VL, and WL of the low-side transistors M1$u$, M1$v$, and M1$w$ of three phases, and sense voltage control signals U1PH, V1PH, and W1PH from the PWM modulation circuit PWMMD'.

The current sense circuits IDET'u, IDET'v, IDETw of three phases detect the magnitude of a current flowing through the low-side transistors M1$u$, M1$v$, and M1$w$ of three phases, and output a current detection result (specifically, a sense voltage Vsens proportional to the detected current) to a current detection node Nsens. The current detection node Nsens is provided commonly for the three phases. The sense current generation circuit IDETt generates a sense current Isens proportional to the sense voltage Vsens.

In FIG. 14, the power supply switch PSW includes a transistor Miso for isolation and its driver, and connects the external power supply voltage Vin to the internal power supply voltage (a high potential-side power supply voltage) Vpwr in a conduction state, as described in FIG. 1. The SPM driver SPMDV is supplied with the internal power supply voltage Vpwr, and drives the motor SPM using sine wave voltages of three phases, as described in FIG. 15. As described in FIG. 15, the current sense circuit unit IDETU' detects a current flowing through the low-side transistors M1$u$, M1$v$, and M1$w$ of three phases, thereby detecting the driving currents of three phases flowing through the motor SPM.

While the motor driving device of FIG. 14 schematically drives the motor SPM using the sine wave voltages of three phases, it performs feedback control of the sine wave voltages of three phases using a current control loop, in a manner that the driving currents of three phases (sine wave currents) flowing through the motor SPM have a preset value. At this time, though different methods are applied for detecting the driving current, the same method as that of, for example, Japanese Unexamined Patent Application Publication No. 2017-85799 can be used as the basic method for the feedback control. Descriptions will hereinafter be made briefly to the basic method for the feedback control.

The current detecting resistor RNF converts the sense current Isens from the sense current generation circuit IDETt into a voltage. The sense amplifier circuit SA amplifies a both-end voltage of the current detecting resistor RNF, and the analog/digital converter ADC converts the amplified voltage into a digital value ADCO.

A current error detection circuit CERDET' detects an error between a current instruction value SPNCR and a digital value from the analog/digital converter ADC (that is, a current detection value of the driving current of each phase) ADCO, using a subtracter SB1. The current instruction value SPNCR is held in a parameter setting register PREG. Specifically, the HDD controller HDDCT of FIG. 1 receives information of an angular frequency (for example, a rotation cycle count value NCNT from the PLL control circuit PLLCT) of the motor SPM, calculates a current instruction value (in other words, a torque value) SPNCR for setting the angular frequency to a target angular frequency in accordance with a predetermined calculation, and sets it into the parameter setting register PREG.

A PI compensator PICP includes an integrator INT, and performs proportional (P)/integration (I) control using, as an input, the error value detected by the current error detection circuit CERDET', thereby calculating a PWM duty value PWMD reflecting the current error. The PI compensator PICP multiples this PWM duty value PWMD by a PWM cycle count number PCNT_N for normal use, thereby calculating the PWM ON count number.

At this time, the parameter setting register PREG holds the PWM cycle count number PCNT_N for normal use and various control gains for normal use in the PI control (in this case, a proportional gain Kcp_N and an integration gain Kci_N). The PWM cycle count number PCNT_N is a number which is obtained by converting the time of one cycle of the PWM signal into a count value of a reference clock of the digital control. The PWM ON count number is a number which is obtained by converting an ON period of one cycle of the PWM signal into the count value.

A sine wave driving voltage control unit SINCT receives the PWM ON count number from the PI compensator PICP, and generates duty instruction values PWMP and SOFTP in association with each PWM cycle. The duty instruction values PWMP and SOFTP are instruction values, for applying sine wave voltages of three phases for the motor SPM and for determining the amplitude of the sine wave voltages in accordance with the PWM ON count value.

Specifically, the sine wave driving voltage control unit SINCT divides one cycle (an electrical angle of 360 degrees) of the sine wave into periods of 60 degrees, fixes one phase of the motor driving nodes Nu, Nv, and Nw of three phases in each period to the internal power supply voltage Vpwr or the ground power supply voltage GND, and controls the remaining two phases using the PWM signal. PWM patterns (that is, how the duty is changed in each PWM cycle of the period of 60 degrees) necessary for the remaining two phases are specified in advance by each normalization table of a PWM pattern generation unit PPG and a soft pattern (SP1 and SP2) generation unit SPG. The PWM pattern generation unit PPG and the soft pattern generation unit SPG weight the value of the normalization table based on the PWM ON count value, thereby generating the duty instruction values PWMP and SOFTP.

As illustrated in FIG. 15, the PWM modulation circuit PWMMD' controls the SPM driver SPMDV and the current sense circuit unit IDETU'. Specifically, the PWM modulation circuit PWMMD' fixes the high-side transistor or the low-side transistor of one phase (for example, u-phase) to ON, in each period of 60 degrees, thereby fixing the motor driving node (Nu) with one phase is fixed to the internal power supply voltage Vpwr or the ground power supply voltage GND. The PWM modulation circuit PWMMD' generates PWM ON signals (PWMONv and PWMONw) of the remaining two phases (v-phase and w-phase), respectively based on the duty instruction values PWMP and SOFTP.

The BEMF detection circuit BFDET detects a BEMF phase of each phase in the motor SPM. Specifically, the BEMF detection circuit BFDET selects one phase of output signals OUTu, OUTv, and OUTw based on a phase selection signal SEL, samples this output signal in accordance with a sampling signal BSH, and at the same time detects a voltage zero cross point (a timing over an intermediate level of the amplitude) of the output signal. The phase error detection circuit PHED detects a phase error between the timing of the voltage zero cross point and an energizing timing signal from the PLL control circuit PLLCT. The PLL control circuit PLLCT controls its own timing in a manner that the phase error approximates to zero, thereby generating an energizing timing signal in synchronization with a BEMF phase (that is, a rotation cycle of the motor SPM). The PLL control circuit PLLCT generates a rotation cycle count value NCNT, based on the energizing timing signal. The rotation cycle count value NCNT is obtained by converting the time proportional to one cycle of the BEMF into a count value of the reference clock of digital control, and is inversely proportional to an angular frequency (ω) of the motor SPM.

The PWM modulation circuit PWMMD' sets the above-described period of 60 degrees based on the energizing timing signal from the PLL control circuit PLLCT. The PWM modulation circuit PWMMD' generates a phase selection signal SEL and a sampling signal BSH, for the above-described BEMF detection circuit BFDET. Specifically, to detect the BEMF phase, the PWM modulation circuit PWMMD' appropriately controls the motor driving node of any one phase to be in a high impedance state for a predetermined mask period, and outputs information of this phase as a phase election signal SEL. This mask period is a period of, for example, approximately electrical angle 15 degrees that is expected to include the voltage zero cross point, based on the energizing timing signal. The sampling signal BSH is generated at a timing (that is, a timing at which a high-side transistor of one of two phase and a low-side transistor of the other phase are both ON) for detecting the BEMF phase.

The current phase detection circuit IPHD detects a driving current phase $\theta i$ of a selection phase based on the phase election signal SEL, based on the phase selection signal SEL from the PWM modulation circuit PWMMD', gate control signals UL, VL, and WL of the low-side transistors M1u, M1v, M1w, and the output signals OUTu, OUTv, OUTw. It is possible to discriminate whether the driving current of the selection phase (for example, u-phase) is in a source direction (positive direction) or a sink direction (a negative direction), in accordance with whether the low-side transistor (M1u) of the selection phase is in an OFF state or an ON state, in a period in which the output signal (OUTu) of the selection phase shifts based on the PWM control. The source direction is a direction from the internal power supply voltage (a high potential-side power supply voltage) Vpwr to the motor driving node, while the sink direction is a direction from the motor driving node to the ground power supply voltage (a low potential-side power supply voltage) GND. In this specification, the driving current (a positive current) in the source direction is referred to as a source current, and the driving current (negative current) in the sink direction is referred to as a sink current.

Based on this principle, the current phase detection circuit IPHD successively judges whether a gate control signal (UL) is equal to or greater than a threshold voltage, in a period in which the output signal (for example, OUTu) of the selection phase shifts. The current phase detection circuit IPHD detects a point of time at which a PWM cycle equal to or greater than a threshold voltage is changed to a PWM cycle lower than a threshold voltage (or a point of time at which the change occurs in the other way round). That is, the current phase detection circuit IPHD detects a point of time (a current zero cross point) at which one of a source current and a sink current is changed to the other, as a driving current phase $\theta i$. Detection of this driving current phase $\theta i$ is performed by providing the same monitoring period of approximately 15 degrees as the mask period, for example, in a period away by 180 degrees from the mask period with detection of the above-described BEMF phase.

A driving voltage phase generation circuit DVPHG includes a driving voltage phase calculation & correction circuit PHCT and a peak value holding circuit PKHD. It sets a driving voltage phase $\theta drvR$ at the time of applying a driving voltage to the motor driving nodes Nu, Nv, and Nw, in a manner that the driving current phase $\theta i$ detected by the current phase detection circuit IPHD coincides with the BEMF phase. In the motor SPM, normally, to make coincidence between the BEMF phase and the driving current phase, it is necessary to control (called as advance angle control) for application of a driving voltage to the motor SPM in a phase advanced from the BEMF phase by a driving voltage phase $\theta drvR$.

The peak value holding circuit PKHD receives a digital value ADCO from the analog/digital converter ADC, and holds the peak value of a current of a predetermined phase as a driving current value ISPNOUT. The driving voltage phase calculation & correction circuit PHOT calculates a driving voltage phase (referred to as $\theta drv$) in accordance with a calculation equation using the rotation cycle count value NCNT, the driving current value ISPNOUT, and predetermined coefficients K1 and K2 held in the parameter setting register PREG.

The predetermined coefficients K1 and K2 are set based on a characteristic constant of the motor. However, they may undesirably be changed in accordance with the manufacturing variation or the environmental change. Thus, the driving voltage phase calculation & correction circuit PHCT corrects the calculated driving voltage phase ($\theta drv$) based on the driving current phase $\theta i$ as an actual detection result, thereby generating a final driving voltage phase $\theta drvR$. At this time, the driving voltage phase calculation & correction circuit PHOT integrates an error between the BEMF phase and the driving current phase $\theta i$, and adds this integrated result to the driving voltage phase ($\theta drv$), to perform the correction.

At the time of integrating the error, coefficients Kvi and Kadj held by the parameter setting register PREG are used. The coefficient Kvi is a value for coinciding between sensitivity for a change of the driving current phase $\theta i$ and sensitivity for a change of the driving voltage phase ($\theta drv$), while the coefficient Kadj is a value of a control gain. The sine wave driving voltage control unit SINCT shifts the PWM pattern and the soft pattern by an electrical angle based on the driving voltage phase $\theta drvR$, and generates the duty instruction values PWMP and SOFTP based on the shifted patterns.

As described above, the PWM modulation circuit PWMMD' performs switching for each 60 degrees, and at the same time outputs a PWM ON signal to the SPM driver SPMDV. Because the driving current of the motor SPM has a sine wave shape, the current detected by the current detecting resistor RNF has repetitive cycles of 60 degrees including the peak of the sine wave. The current error detection circuit CERDET' includes an instruction current correction circuit CRNTCP which generates a digital pattern reproducing this sine wave shape.

The current error detection circuit CERDET' multiplies the above-described current instruction value SPNCR by a digital pattern from the instruction current correction circuit CRNTCP, and outputs the multiplication result to the subtracter SB1 instead of the current instruction value SPNCR. The instruction current correction circuit CRNTCP outputs a trigger signal UPADC at a peak timing of the sine wave shape, and the peak value holding circuit PKHD latches the digital value ADCO in accordance with the trigger signal UPADC.

The power supply monitor circuit VMN monitors the external power supply voltage Vin, as described in FIG. 1, and outputs a reset signal NPOR, when power interruption of the external power supply voltage Vin is detected (that is, when it is lower than a predetermined judgment voltage). The power supply switch PSW disconnects the internal power supply voltage Vpwr from the external power supply voltage Vin, in accordance with the reset signal NPOR. As a result, the internal power supply voltage Vpwr is maintained by regenerative energy of the motor SPM. The post control circuit PCT controls the head HD to be retracted in accordance with the reset signal NPOR, and outputs a brake ON signal BRKON at the completion of the retraction. The PWM modulation circuit PWMMD' controls entirely the low-side transistors M1$u$, M1$v$, and M1$w$ to be ON, and controls entirely the high-side transistors M0$u$, M0$v$, and M0$w$ to be OFF, in accordance with the brake ON signal BRKON, thereby performing the short brake to stop the motor SPM.

Figure 16:
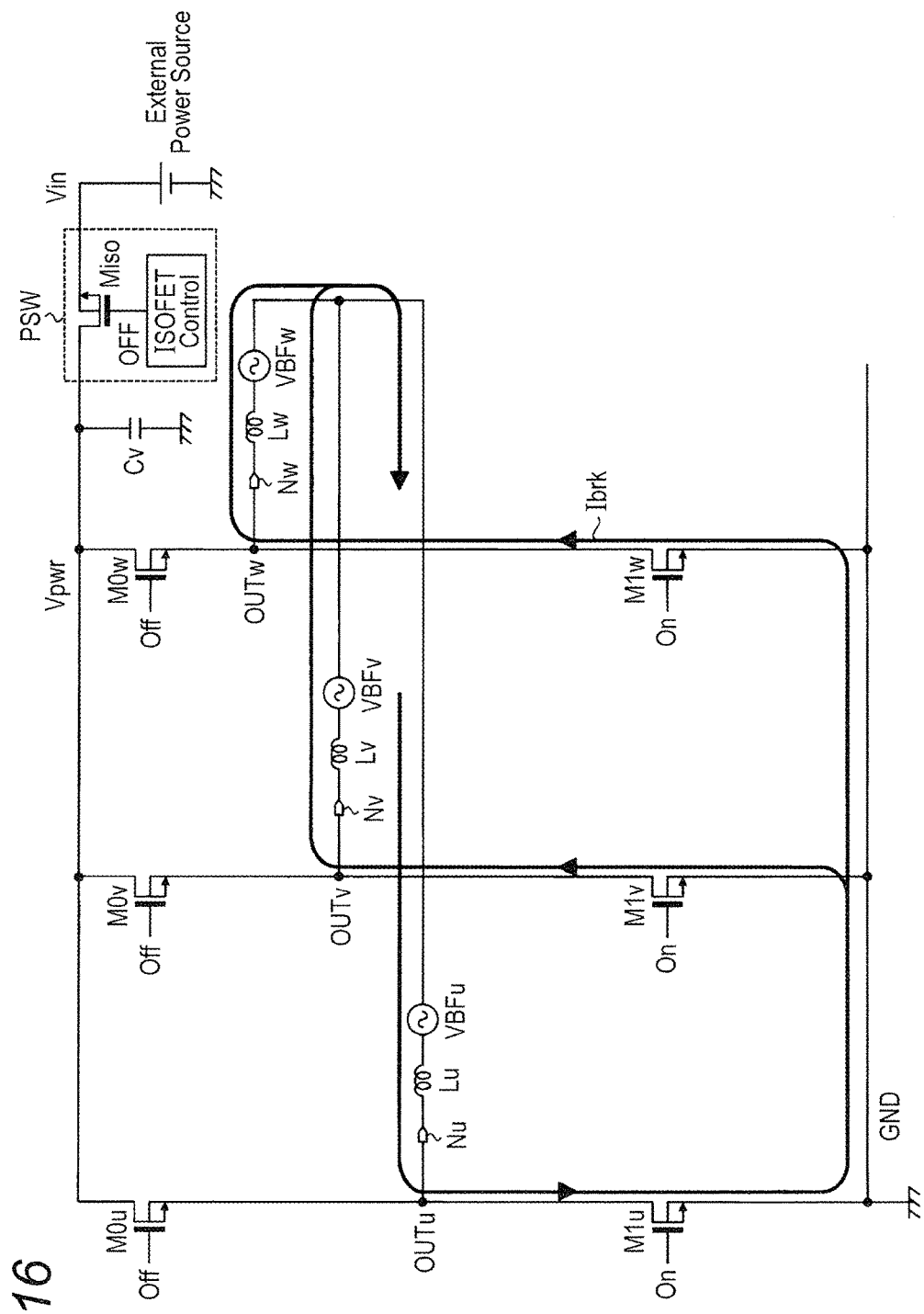
FIG. 16 is an explanatory diagram illustrating an operation example at the time of short braking in the motor driving device of FIG. 14 and FIG. 15.

FIG. 16 is an explanatory diagram illustrating an operation example at the time of short braking in the motor driving device of FIG. 14 and FIG. 15. In FIG. 16, the motor SPM can be represented equivalently by coils Lu, Lv, and Lw of three phases and AC voltage sources VBFu, VBFv, and VBFw of three [] phases based on the BEMF. By performing short braking, as illustrated in FIG. 16, a brake current Ibrk flows along a path through the ground power supply voltage GND between the motor and the low-side transistors M1$u$, M1$v$, and M1$w$. Thus, the BEMF is consumed, and the motor can quickly be stopped. In the example of FIG. 16, it is assumed that the motor driving node Nu has a positive voltage and that the motor driving nodes Nv and Nw have a negative voltage. In this case, the brake current Ibrk from the u-phase flows into the v-phase and the w-phase.

<Specific Configuration Around Current Sense Circuit (Comparative Example)>

Figure 17:
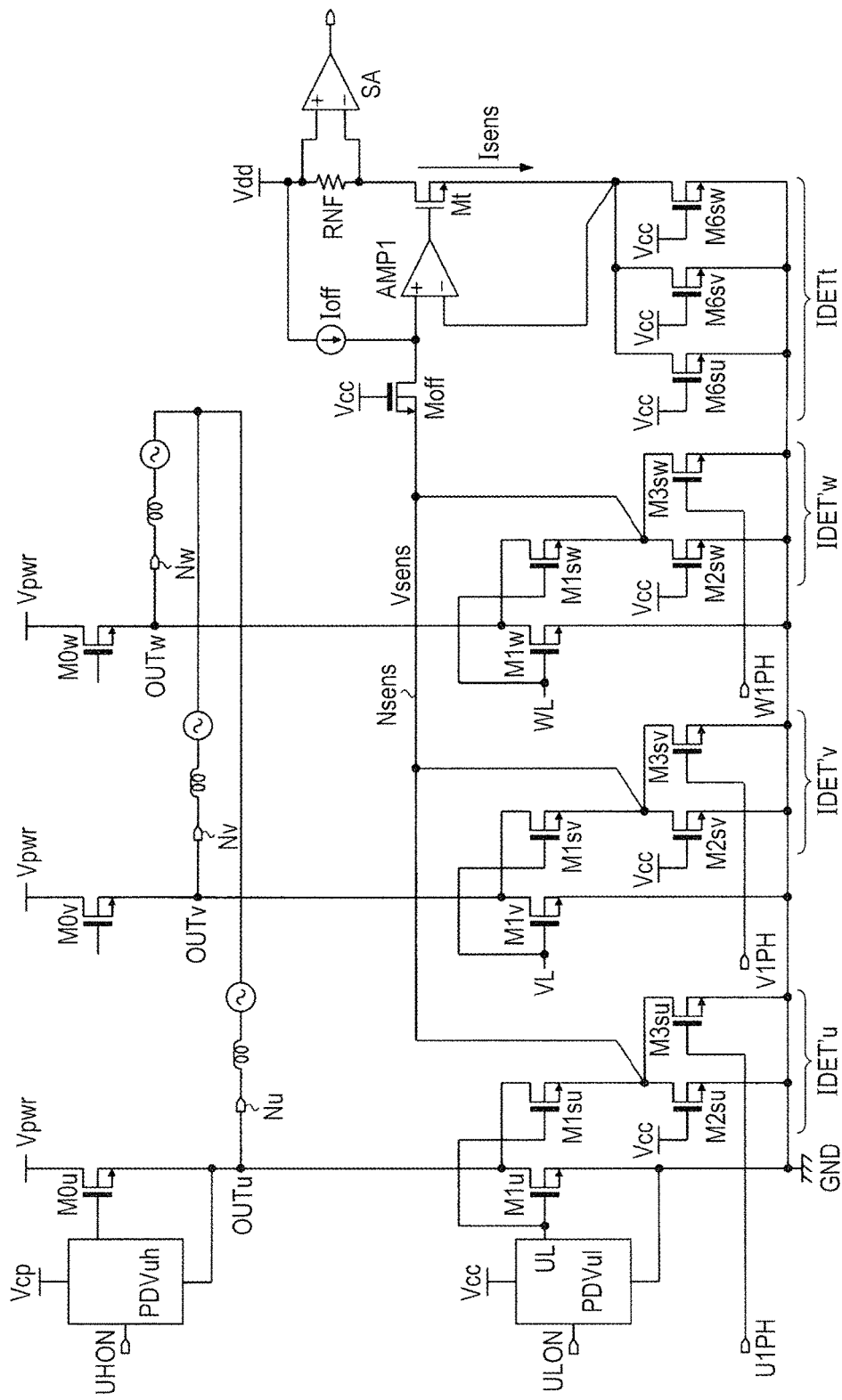
FIG. 17 is a circuit diagram illustrating a specific configuration example around the current sense circuit in FIG. 15.

FIG. 17 is a circuit diagram illustrating a specific configuration example around a current sense circuit in FIG. 15. In FIG. 17, a u-phase high side pre-driver PDVuh and a u-phase low-side pre-driver PDVu1 are included in the u-phase pre-driver PHVu of FIG. 15. When the ground power supply voltage GND and a power supply voltage Vcc are supplied, the u-phase low-side pre-driver PDVu1 controls the low-side transistor M1$u$ to be in the ON state in accordance with the u-phase low-side ON signal ULON. When a voltage of the output signal OUTu and a power supply voltage Vcp having a voltage obtained by boosting the voltage using the power supply voltage Vcc are supplied, the u-phase high-side pre-driver PDVuh controls the high-side transistor M0$u$ to be in the ON state in accordance with a u-phase high-side ON signal UHON. Though no illustration is given, the v-phase and the w-phase have the same configuration.

The u-phase current sense circuit IDET' includes three transistors M1$su$, M2$su$, and M3$su$ for sensing. Each of the transistors M1$su$, M2$su$, and M3$su$ for sensing is configured with the driving transistor and the same type of elements (in this case, nMOS transistors), and is configured with a transistor size having one-several thousandth of the driving transistor (for example, M1$u$). For example, the low-side transistor M1$u$ is configured with a plurality of units of transistors which are parallelly coupled with each other. Each of the transistors M1$su$, M1$su$, and M3$su$ for sensing is configured in a form that a part of the units of the transistors are diverted.

The transistor M1$su$ for sensing is coupled between the u-phase motor driving node Nu and the current detection node Nsens which is common to three phases. To the transistor M1$su$, the same gate control signal UL as that for the low-side transistor M1$u$ is input. The transistor M2$su$ for sensing is coupled between the current detection node Nsens and the ground power supply voltage GND, and is fixed into the ON state, when a predetermined power supply voltage VCC is applied to the gate. The transistor M3$su$ for sensing is coupled between the current detection node Nsens and the ground power supply voltage GND, and controlled to be ON/OFF in accordance with the sense voltage control signal U1PH.

Similarly, the v-phase current sense circuit IDET' includes three transistors M1$sv$, M2$sv$, M3$sv$ for sensing. The transistor M1$sv$ for sensing is coupled between a v-phase motor driving node Nv and the current detection node Nsens. To the transistor M1$sv$, the same gate control signal VL as that for the low-side transistor M1$v$ is input. The transistor M2$sv$ for sensing is coupled between the current detection node Nsens and the ground power supply voltage GND, and is fixed into the ON state. The transistor M3$sv$ for sensing is coupled between the current detection node Nsens and the ground power supply voltage GND, and is controlled to be ON/OFF in accordance with the sense voltage control signal V1PH. Similarly for the w-phase, the w-phase current sense circuit IDET'w includes a transistor M1$sw$ for sensing to which a gate control signal WL is input, a transistor M2$sw$ for sensing which is fixed into the ON state, and a transistor M3$sw$ for sensing to which a sense voltage control signal W1PH is input.

When the motor SPM is driven using sine wave voltages of three phases, the electrical angle of 360 degrees has two periods. In one period, one of three phases causes a sink current to flow, and the remaining two phases cause a source current to flow. In the other period, two of three phases cause a sink current to flow, and the remaining one phase causes a source current to flow. In this specification, the former period is referred to as one-phase sink period, while the latter period is referred to as two-phase sink period. The phase for causing a sink current to flow is referred to as a sink phase, while a phase for causing a source current to flow is referred to as a source phase. Each of the two-phase sink period and the one-phase sink period has three combinations. Thus, the electrical angle of 360 degrees has six different periods in association with each 60 degrees.

When driven in the ON state, the low-side transistor with the sink phase causes a driving current (a sink current) to flow in a direction from the motor driving node of this phase to the ground power supply voltage GND. In addition, when driven in the ON state, the high-side transistor causes a reflux current to flow in a direction from the motor driving node of this phase to the internal power supply voltage Vpwr. On the contrary, when driven in the ON state, the high-side transistor with the source phase causes a driving current (a source current) to flow in a direction from the internal power supply voltage Vpwr to the motor driving node of this phase. In addition, when driven in the ON state, the low-side transistor causes a reflux current to flow in a direction from the ground power supply voltage GND to the motor driving node of this phase.

In the one-phase sink period, the PWM modulation circuit PWMMD' of FIG. 15 controls a sense voltage control signal (U1PH) of the corresponding phase (for example, u-phase) into "H" level (an assert level), and controls sense voltage control signals (V1PH and W1PH) of the remaining two phases (v-phase and w-phase) into "L" level (a negate level). As a result, the transistor (M3$su$) for sensing of this one phase in FIG. 17 is controlled to be in the ON state.

In the two-phase sink period, the PWM modulation circuit PWMMD' of FIG. 15 controls sense voltage control signals (U1PH, V1PH, and W1PH) of three phases to be in "L" level. As a result, the transistors M3$su$, M3$sv$, and M3$sw$ for sensing of three phases in FIG. 17 are all controlled to be in the OFF state. At the current detection node Nsens, there is generated a sense voltage Vsens which is appropriately divided into resistances in accordance with the ON/OFF state of each of the transistors M1$s$ (u, v, and w), M2$s$ (u, v, and w), and M3$s$ (u, v, and w) for sensing.

The sense current generation circuit IDETt includes a transistor Moff for offset adjustment, an amplifier circuit AMP1, a current source Ioff for offset, a transistor Mt for current generation, and transistors M6$su$, M6$sv$, and M6$sw$ for sensing. The transistors M6$su$, M6$sv$, and M6$sw$ for sensing are the same kind of elements (in this case, nMOS transistors) as, for example, the driving transistors, and are configured to have a predetermined transistor size ratio to the driving transistor. The transistor Moff for offset adjustment and the transistor Mt for current generation are also configured with the nMOS transistors.

The transistor Moff for offset adjustment is coupled between the current detection node Nsens and a positive electrode input node of the amplifier circuit AMP1, and is fixed into the ON state. The amplifier circuit AMP1 drives the transistor Mt for current generation. Then, an output voltage (in this case, a source voltage) of the transistor Mt for current generation is fed back to a negative electrode input node. The transistors M6$su$, M6$sv$, and M6$sw$ for sensing are parallelly coupled between an output voltage of the transistor Mt for current generation and the ground power supply voltage GND.

According to this configuration, the sense current generation circuit IDETt performs negative feedback control in a manner that the output voltage of the transistor Mt for current generation coincides with a sense voltage Vsens of the current detection node Nsens. The sense current generation circuit IDETt generates this output voltage (Vsens) and a sense current Isens which is determined in accordance with a parallel resistance values of the transistors M6$su$, M6$sv$, and M6$sw$ for sensing. This sense current Isens is converted into a voltage using the current detecting resistor RNF, and amplified by the sense amplifier circuit SA.

If a negative offset voltage is generated in the amplifier circuit AMP1, a driving current (a sense voltage Vsens which is close to zero) close to zero cannot be detected. A positive offset voltage is in advance applied to the amplifier circuit AMP1, by causing an offset current by the current source Ioff for offset to flow through the transistor Moff for offset adjustment having a predetermined ON resistance. As a result, even if a negative offset voltage is generated in the amplifier circuit AMP1, it is possible to detect the driving current which is close to zero.

The analog/digital converter ADC detects an output voltage of the sense amplifier circuit SA as an initial value, in a state where no driving current flows through each phase, thereby compensating for an effect of thus-adjusted offset voltage of the amplifier circuit AMP1. It is preferred that the transistor Moff for offset adjustment is configured with the same kind of elements as those of the driving transistor. As a result, it is possible to cancel the variation component, such as a temperature characteristic, thereby enabling to reduce the current detection error.

<Specific Operation Around Current Sense Circuit (Comparative Example)>

Figure 18:
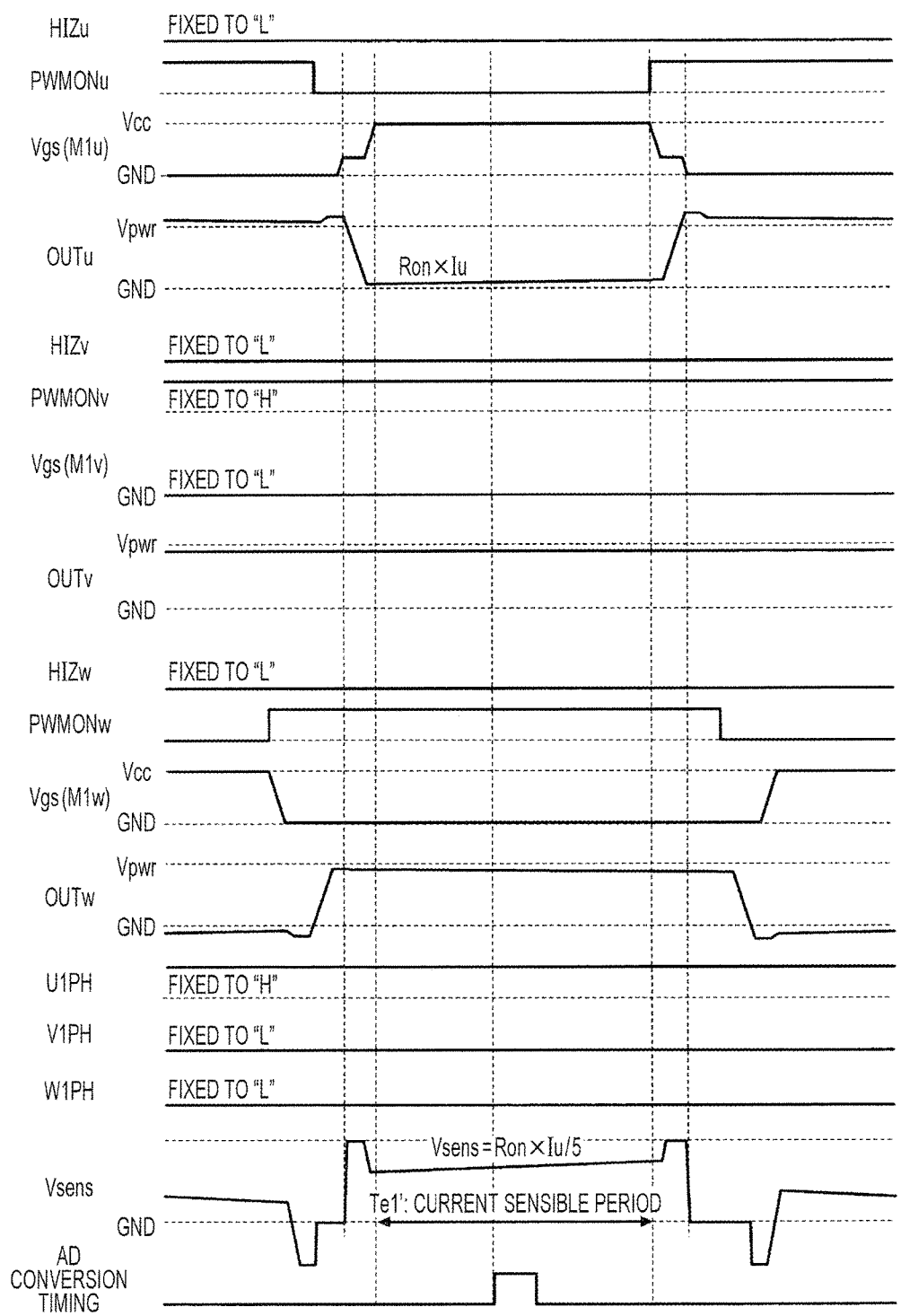
FIG. 18 is a waveform diagram illustrating an operation example when performing current sensing at the time of normal motor driving in FIG. 17.
Figure 19:
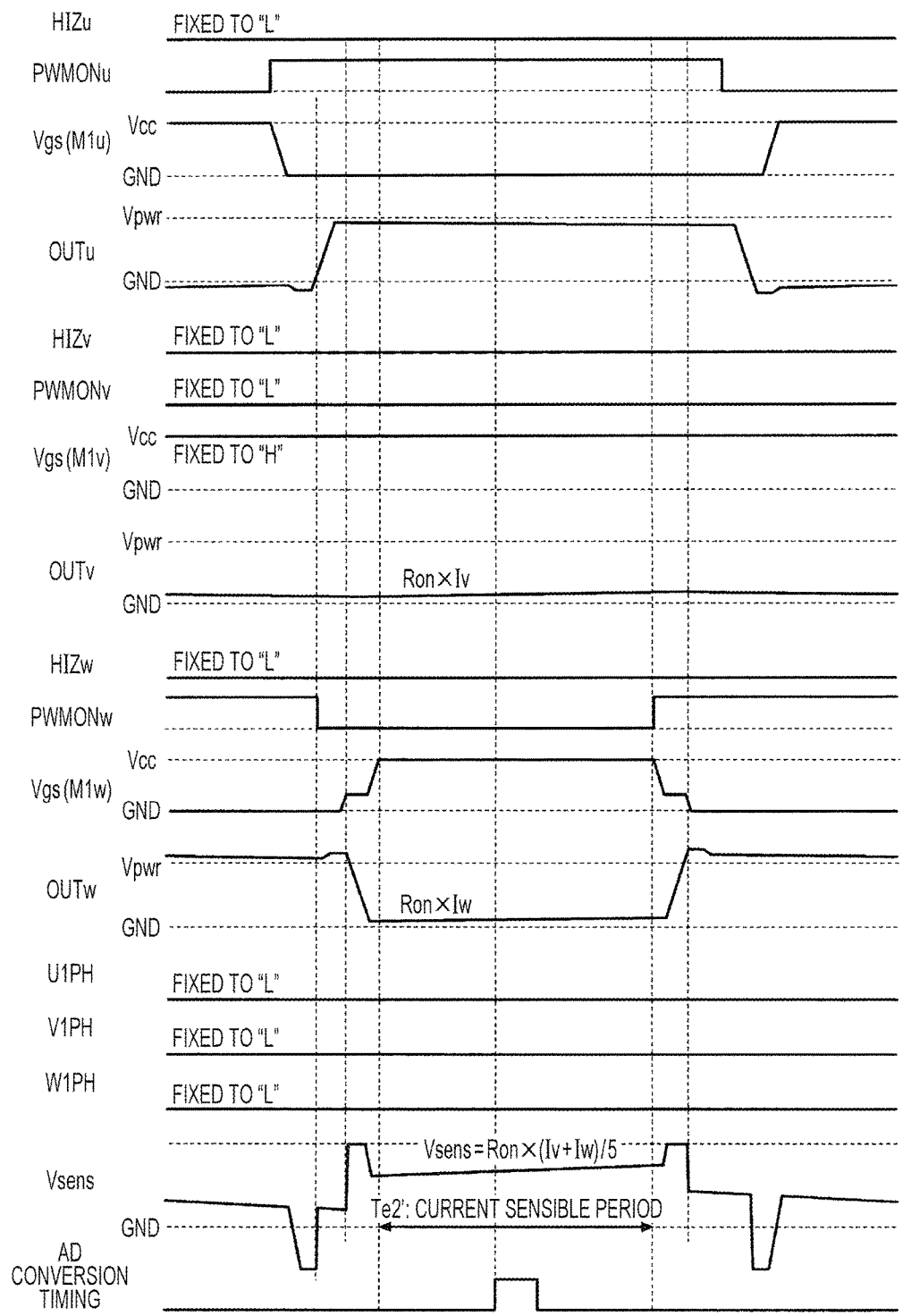
FIG. 19 is a waveform diagram illustrating another operation example when performing current sensing at the time of normal motor driving in FIG. 17.
Figure 20A:
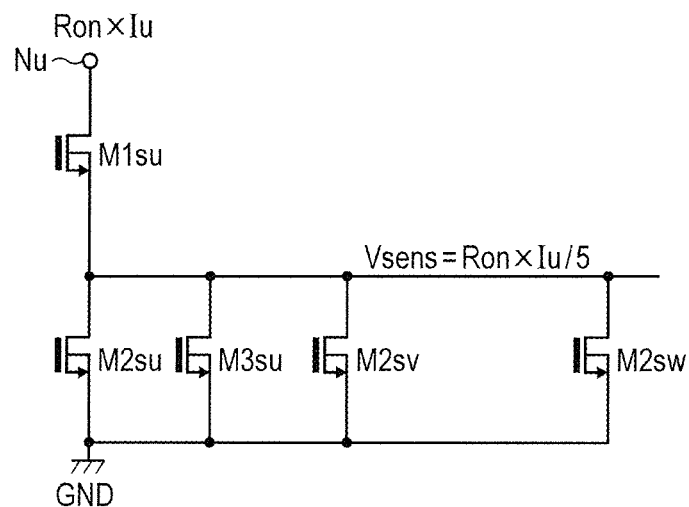
FIG. 20A is a supplementary diagram illustrating an operation state at the time of current sensing in FIG. 18.
Figure 20B:
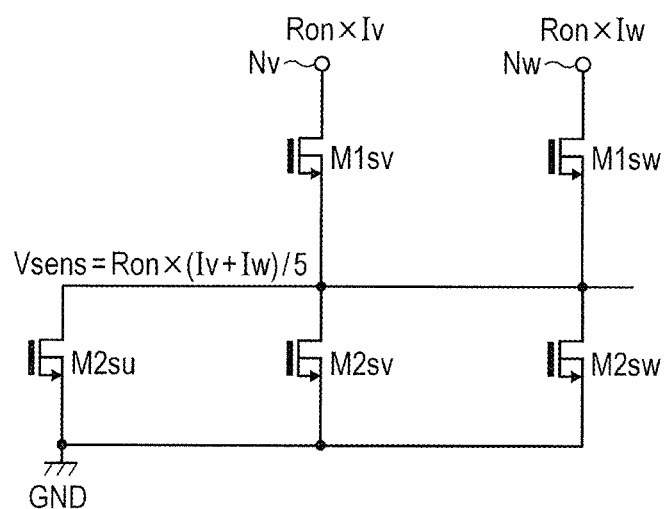
FIG. 20B is a supplementary diagram illustrating an operation state at the time of current sensing in FIG. 19.

FIG. 18 is a waveform diagram illustrating an operation example, when performing current sensing at the time of normal motor driving in FIG. 17. FIG. 19 is a waveform diagram illustrating another operation example when performing current sensing at the time of normal motor driving in FIG. 17. FIG. 20A is a supplementary diagram illustrating an operation state at the time of current sensing in FIG. 18. FIG. 20B is a supplementary diagram illustrating an operation state at the time of current sensing in FIG. 19.

FIG. 18 illustrates an operation example in one PWM cycle in a plurality of PWM cycles included in one-phase sink period in which the u-phase is a sink period. For the u-phase, the high-impedance signal HIZu is fixed to the "L" level (a negate level), and the PWM ON signal PWMONu appropriately shifts with the PWM control. In the "H" level of the PWM ON signal PWMONu, the high-side transistor M0$u$ is controlled to be in the ON state. In the "L" level, the low-side transistor M1$u$ is controlled to be in the ON state. When the PWM ON signal PWMONu shifts in the "L" level, the u-phase pre-driver PDVu drives the high-side transistor M0$u$, through which a reflux current flows, into the OFF state. After this, it drives the low-side transistor M1$u$ into the ON state.

Specifically, a gate-source voltage Vgs (that is, a gate control signal UL) of the low-side transistor M1$u$ increases in a step-wise manner, when it is driven in the ON state. When this gate-source voltage Vgs (M1$u$) reaches a predetermined value, a reflux diode of the high-side transistor M0$u$ is OFF, and the output signal OUTu is decreased from the internal power supply voltage Vpwr level to the ground power supply voltage GND level. If the low-side transistor M1$u$ is completely in the ON state, the voltage level of the output signal OUTu is "Ron×Iu", when the on-resistance of each of the low-side transistors M1$u$, M1$v$, and M1$w$ is "Ron", and the driving current (a sink current) flowing through the low-side transistor M1$u$ is "Iu".

After this, if the PWM ON signal PWMONu shifts to the "H" level, the u-phase pre-driver PDVu drives the low-side transistor M1$u$ through which the sink current flows into the OFF state. Then, the high-side transistor M0$u$ is driven in the ON state. Specifically, if a gate-source voltage Vgs of the low-side transistor M1$u$ is driven into the OFF state, it is decreased in a step-wise manner. At the same time, the output signal OUTu is increased from the ground power supply voltage GND level to the internal power supply voltage Vpwr level.

If the gate-source voltage Vgs (M1$u$) reaches a predetermined value, the reflux diode of the high-side transistor M0$u$ is ON. As a result, the output signal OUTu is at the internal power supply voltage Vpwr level, and the low-side transistor M1$u$ is in the OFF state. The high-side transistor M0$u$ is driven in the ON state, after the low-side transistor M1$u$ is in the OFF state (at the same time, after the output signal OUTu shifts). As a result, the reflux current flowing through the reflux diode of the high-side transistor M0u flows through the high-side transistor M0u.

For the v-phase, the high impedance signal HIZv is fixed to the "L" level (a negate level), the PWM ON signal PWMONv is fixed to the "H" level. As a result, the gate-source voltage Vgs (M1v) (that is, the gate control signal VL) of the low-side transistor M1v is fixed to the "L" level, the high-side transistor M0v is fixed to the ON state, and the low-side transistor M1v is fixed to the OFF state. The output signal OUTv is maintained at the internal power supply voltage Vpwr level. As described above, this v-phase is a target phase in which its voltage is fixed to the internal power supply voltage Vpwr by the PWM modulation circuit PWMMD'.

For the w-phase, the high impedance signal HIZw is fixed to the "L" level (a negate level), the PWM ON signal PWMONw appropriately shifts with the PWM control. If the PWM ON signal PWMONw shifts to the "H" level, the w-phase pre-driver PDVw drives the low-side transistor M1w through the reflux current flows into the OFF state, thereafter driving the high-side transistor M0w into the ON state.

Specifically, if the gate-source voltage Vgs (that is, the gate control signal WL) of the low-side transistor M1w is driven into the OFF state, it is decreased immediately to the ground power supply voltage GND level. As a result, the low-side transistor M1w is immediately OFF, and the reflux current is maintained by the reflux diode of the low-side transistor M1w. The high-side transistor M0w is driven into the ON state, after the low-side transistor M1w is OFF. The gate-source voltage (not illustrated) of the high-side transistor M1w is driven into the ON state, it is increased in a step-wise manner, like the case of the above-described u-phase low-side transistor M1u. At the same time, the output signal OUTw is increased from the ground power potential voltage GND to the internal power supply voltage Vpwm.

After this, if the PWM ON signal PWMONw shifts to the "L" level, the w-phase pre-driver PDVw drives the high-side transistor M0w through which the source current flows into the OFF state, and drives the low-side transistor M1w into the ON state. Specifically, if the gate-source voltage (not illustrated) of the high-side transistor M0w is driven into the OFF state, it is decreased in a step-wise manner like the case of the above-described u-phase low-side transistor M1u. At the same time, the output signal OUTw is decreased from the internal power supply voltage Vpwr level to the ground power supply voltage GND level.

The low-side transistor M1w is driven into the ON state, after the high-side transistor M0w is OFF (at the same time, after the output signal OUTw shifts). After the gate-source voltage Vgs of the low-side transistor M1w is driven into the ON state, it is immediately increased to the power supply voltage Vcc level. As a result, the reflux current flowing through the reflux diode of the low-side transistor M1w flows through the low-side transistor M1w.

In this manner, the low-side transistor M1u of the sink phase switches between the driving current (a sink current) and the reflux current on the opposed side, in accordance with PWM control. Thus, the gate-source voltage Vgs (M1u) is changed in a step-wise manner, and also the output signal OUTt shifts. On the contrary, the high-side transistor M0u of the sink phase switches a path of the reflux current between itself and the reflux diode in accordance with PWM control. Thus, the gate-source voltage is to be immediately changed without the shift of the output signal OUTu.

Similarly, the high-side transistor with the source phase (for example, M0w) switches between the driving current (a source current) and the reflux current on the opposed side in accordance with the PWM control. Thus, the gate-source voltage is changed in a step-wise manner, and at the same time the output signal (OUTw) also shifts. The low-side transistor (M1w) with the source phase switches between a path of the reflux current between itself and its reflux diode in accordance with the PWM control. Thus, the gate-source voltage (Vgs (M1w)) is to be immediately changed, without the shift of the output signal (OUTw).

The current phase detection circuit IPHD described in FIG. 14 detects a driving current phase θi using the relationship between the gate-source voltage and the output signal. As illustrated in FIG. 18, the voltage level of each of the output signals OUTu, OUTv, and OUTw with each phase slightly deviates from the ground power supply voltage GND or the internal power supply voltage Vpwr, in accordance with the relationship between the direction (source current and sink current) and magnitude of the current, the on-resistance of the driving transistor, and the forward direction voltage of the reflux diode.

In the one-phase sink period, such as the u-phase, as illustrated in FIG. 18, as described above, the sense voltage control signal U1PH with the u-phase is controlled into the "H" level (an assert level), and the sense voltage control signals V1PH and W1H with the v-phase and the w-phase are controlled into the "L" level (a negate level). In this state, the period in which the low-side transistor M1u is completely ON (that is, the period in which the gate-source voltage Vgs (M1u) is the power supply voltage Vcc) is a current sensible period Te1'. In this period, the transistor M1su for sensing is also completely in the ON state.

FIG. 20A illustrates an equivalent circuit of current sense circuits IDET' of three phases (u, v, and w) in this current sensible period Te1'. As illustrated in FIG. 20A, the voltage of "Ron×Iu" generated in the motor driving node Nu by the low-side transistor M1u is divided into resistances by five transistors M1su, M2s (u, v, and w), and M3su for sensing to be ON. When these five transistors for sensing have equal on-resistances, the sense voltage Vsens is "Ron×Iu/5".

In FIG. 17, when the transistor size ratio of the transistors M6su, M6sv, and M6sw for sensing is "1/m" of the low-side transistor, the parallel resistance value (R6) of the transistors for sensing is "m×Ron/3". In this case, the sense current Isens is "Vsens/R6=3×Iu/(5×m)". The analog/digital converter ADC of FIG. 14, as described in FIG. 18, samples an output voltage of the sense amplifier circuit SA, at a timing close to the center of the current sensible period Te1'.

FIG. 19 illustrates an operation example in one PWM cycle of a plurality of PWM cycles included in two-phase sink period in which the v-phase and the w-phase are sink phases. For the u-phase, the high impedance signal HIZu is fixed into the "L" level, and the PWM ON signal PWMONu is appropriately shifts in accordance with the PWM control. If the PWM ON signal PWMONu shifts into the "H" level, the u-phase pre-driver PDVu drives the low-side transistor M1u, through which the reflux current flows, into the OFF state. Then, it drives the high-side transistor M0u into the ON state.

At this time, because the low-side transistor M1u is a low-side transistor with the source phase, its gate-source voltage Vgs (M1u) is decreased immediately to the ground power supply voltage GND level in accordance with driving into the OFF state, as described in FIG. 18. At this time, the output signal OUTu does not shift. After this, if the high-side transistor M0u is driven into the ON state, its gate-source voltage (not illustrated) is increased in a step-wise manner. At this time, the output signal OUTu shifts from the ground power supply voltage GND level to the internal power supply voltage Vpwr level.

After this, if the PWM ON signal PWMONu shifts to the "L" level, the u-phase pre-driver PDVu drives the high-side transistor M0u, through which the source current flows, into the OFF state. Then, it drives the low-side transistor M1u into the ON state. The output signal OUTu shifts from the internal power supply voltage Vpwr level to the ground power supply voltage GND level, as this high side transistor M0u is driven into the OFF state. After this, the gate-source voltage Vgs (M1u) of the low-side transistor (M1u) is increased to the power supply voltage Vcc level immediately in accordance with the driving into the ON state.

For the v-phase, the high impedance signal HIZv is fixed to the "L" level, while the PWM ON signal PWMONv is fixed to the "L" level. As a result, the gate-source voltage Vgs (M1v) of the low-side transistor M1v is fixed to the "H" level, the high-side transistor M0v is fixed to the OFF state, and the low-side transistor M1v is fixed to the ON state. The output signal OUTv is maintained at the ground power supply voltage GND level. Specifically, the voltage level of the output signal OUTv is "Ron×Iv", when the driving current (sink current) of the low-side transistor M1v is represented as "Iv". As described above, this v-phase is a target phase in which its voltage is fixed to the ground power supply voltage GND by the PWM modulation circuit PWMMD'.

For the w-phase, the high impedance signal HIZw is fixed to the "L" level, and the PWM ON signal PWMONw appropriately shifts in accordance with the PWM control. The PWM ON signal PWMONw shifts to the "L" level, the w-phase pre-driver PDVw drives the high-side transistor M0w, through which the reflux current flows, into the OFF state. After this, it drives the low-side transistor M1w into the ON state.

At this time, because the low-side-transistor M1w is a low-side transistor of sink-phase. As illustrated in FIG. 18, the gate-source voltage Vgs (M1w) is increased in a step-wise manner in accordance with the driving into the ON state. At the same time, the output voltage OUTw is decreased from the internal power supply voltage Vpwr level to the ground power supply voltage GND level. As a result, the voltage level of the output voltage OUTw is "Ron×Iw", when the driving current (a sink current) of the low-side transistor M1w is represented as "Iw".

After this, when the PWM ON signal PWMONw shifts to the "H" level, the w-phase pre-driver PDVw drives the low-side transistor M1w, through which the sink current flows, into the OFF state. After this, it drives the high-side transistor M0w into the ON state. The gate-source voltage Vgs (M1w) of the low-side transistor M1w is increased in a step-wise manner in accordance with the driving into the OFF state. At the same time, the output voltage OUTw is increased from the ground power supply voltage GND to the internal power supply voltage Vpwr level.

As illustrated in FIG. 19, in the sink period of two phases of the v-phase and the w-phase, as described above, the sense voltage control signals U1PH, V1PH, and W1PH of the u-phase, v-phase, and w-phase are controlled into the "L" (a negate level). In this state, the period in which the low-side transistors M1v and M1w of the v-phase and w-phase are completely ON (that is, a period in which the gate-source voltages Vgs (M1v) and Vgs (M1w) are a power supply voltage Vcc) is a current sensible period Te2'. In this period, the transistors M1sv and M2sw for sensing are completely in the ON state.

FIG. 20B illustrates an equivalent circuit of the current sense circuit IDET' for three phases (u, v, and w) in the current sensible period Te2'. As illustrated in FIG. 20B, the voltages of "Ron×Iv" and "Ron×Iw" generated in the motor driving nodes Nv and Nw by the low-side transistors M1v and M1w are divided into resistances by five transistors M1sv, M1sw, and M2s (u, v, and w) for sensing to be ON. When the on-resistances of the five transistors are equal to each other, the sense voltage Vses is "Ron×Iv+Iw)/5".

That is, using, for example, a principle of overlapping, the same equivalent circuits as that of the case in FIG. 20A is applied respectively to "Ron×Iv" and "Iw". By overlapping the sense voltages obtained by them, it is possible to obtain "Ron×(Iv+Iw)/5". In this case, "Iv+Iw" is equal to "Iu". Thus, the sense voltage Vsens is substantially to detect a driving current (source current) of the one phase (u-phase) in a two-phase sink period (in other words, one-phase source period). This sense voltage Vsens is equal to the driving current (sink current) of the one phase (u-phase) in the one-phase sink period, detected in FIG. 18.

Like the case of FIG. 18, the sense current Isens in FIG. 17 is "3×(Iv+Iw)/(5×m)=3×Iu/(5×m)". As illustrated in FIG. 19, the analog/digital converter of FIG. 14 samples an output voltage of the sense amplifier circuit SA, at a timing near the center of the current sensible period Te2'.

Using the above-described current sense system, when the motor SPM is driven by sine wave voltages of three phases, both in the one-phase sink period and the two-phase sink period, it is possible to detect the driving current (Iu) of a target phase (in this case, the u-phase), and it is also possible to obtain the same detection result (that is, the sense voltage Vsens) in each period. By changing the target phase in association with each 60 degrees, it is possible to detect the driving current of each phase in the entire electrical angle of 360 degrees.

<Problem at the Time of Short Braking>

At the time of short braking, as described above, the safety of the driving transistors (for example, the low-side transistors M1u, M1v, and M1w) may undesirably be lowered. This is because, in FIG. 16, as the resistance of each of the driving transistors (M1u, M1v, and M1w) and the coils Lu, Lv, and Lw is decreased, the brake current Ibrk is increased, as the counter electromotive voltage is increased, by increasing the torque constant for due to increasing the torque constant for the high accuracy. To solve this problem, the following methods are given.

First, there is given a method for maintaining the brake current Ibrk equal to or lower than a tolerable current, by not starting the short braking until the number of rotation of the motor (voltage level of the BEMF) is decreased to a certain extent. In this case, it is difficult to quickly stop the motor SPM. Second, there is given a method for increasing the size of the driving transistor and increasing the ASO of the driving transistor. However, this method undesirably causes an increase in the circuit scale and an increase in the cost.

As a third method, there is given a method for detecting a brake current Ibrk flowing through the SPM driver SPMDV (at the same time, the motor SPM) at the time of short braking, and controlling this brake current Ibrk to be equal to or lower than a rated current. For this method, it is considered to use the current sent circuits IDET' of three phases (u, v, and w), for example, as illustrated in FIG. 17. However, in the current sense circuits IDET' (u, v, and w) of FIG. 17, it is difficult to detect the brake current Ibrk.

Specifically, at the time of short braking, the low-side transistors M1u, M1v, and M1w of three phases are all driven into the ON state. Thus, the gate control signals UL, VL, and WL are all at the "H" level. At the same time, the transistors m1su, M1sv, and M1sw for sensing are also in the ON state. As a result, the sense voltage Vsens will be the total voltage of voltages of the motor driving nodes Nu, Nv, and Nw, and this total voltage is always zero.

<Configuration Around SPM Driver and Current Sense Circuit (First Embodiment)>

Figure 2:
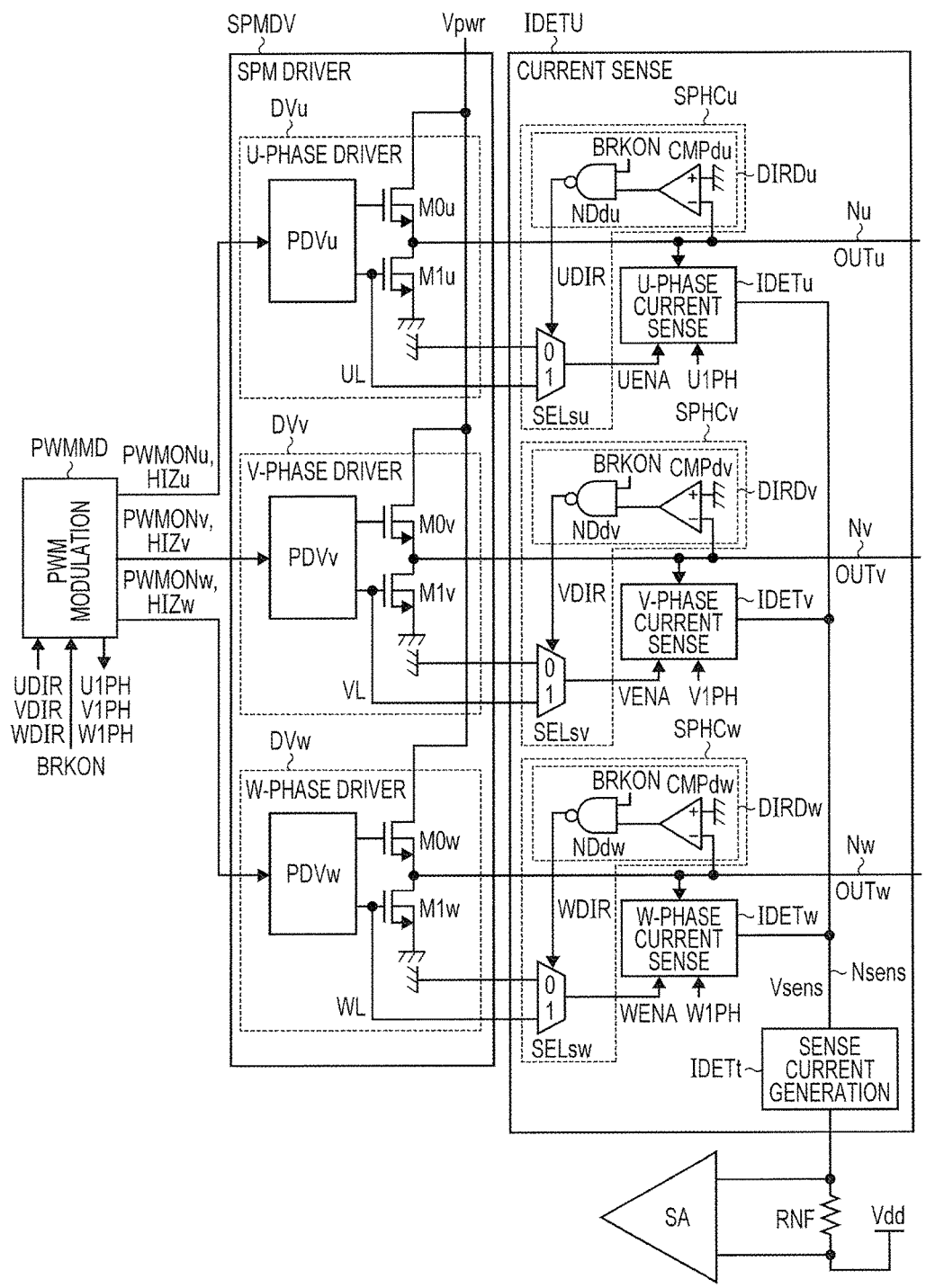
FIG. 2 is a circuit block diagram illustrating a configuration example around an SPM driver and a current sense circuit, in a motor driving device according to the first embodiment of the present invention.
Figure 3:
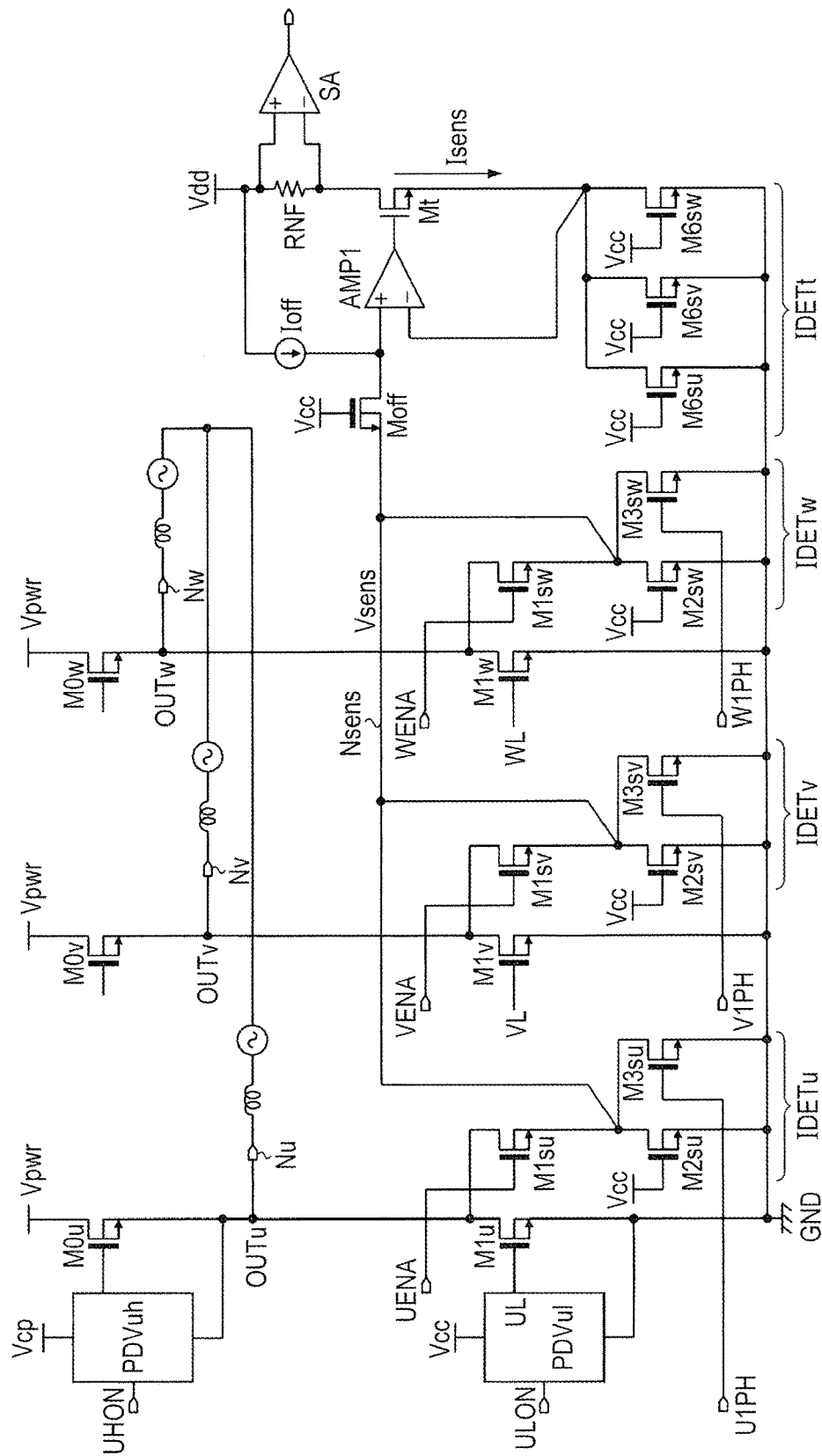
FIG. 3 is a circuit diagram illustrating a specific configuration example around a current sense circuit in FIG. 2.

FIG. 2 is a circuit block diagram illustrating a configuration example around the SPM Driver and the current sense circuit, in the motor driving device according to the first embodiment of the present invention. FIG. 3 is a circuit diagram illustrating a specific configuration example around the current sense circuit in FIG. 2. In the configuration example of FIG. 2, the current sense circuit unit IDETU has a configuration different from that of the configuration example of FIG. 15. Further, unlike the configuration of FIG. 15, direction detection signals UDIR, VDIR, and WDIR are input to the PWM modulation circuit PWMMD. The current sense circuit unit IDEUT includes sense-phase control circuits SPHCu, SPHCv, and SPHCw of three phases, in addition to the current sense circuits IDETu, IDETv, and IDETw of three phases (u-phase, v-phase, and w-phase).

Unlike the current sense circuits IDET'u, IDET'v, and IDET'w of three phases, sense-phase control signals UENA, VENA, and WENA are input to the current sense circuits IDETu, IDETv, and IDETw of three phases of FIG. 15, instead of the gate control signals UL, VL, and WL. That is, as illustrated in FIG. 3, the transistors M1su, M1sv, and M1sw for sensing are controlled to be ON/OFF respectively in accordance with the sense-phase control signals UENA, VENA, WENA, instead of the gate control signals UL, VL, and WL illustrated in FIG. 17.

In FIG. 2, the sense-phase control circuits SPHCu, SPHCv, and SPHCw of three phases schematically control the transistors M1su, M1sv, and M1sw for sensing to be ON/OFF using different control methods between an operation mode for performing short braking and an operation mode for causing a driving current to flow through the motor SPM. In this specification, the former operation mode is referred to as a brake mode, while the latter operation mode is referred to as a motor driving mode. In the brake mode, the sense-phase control circuits SPHCu, SPHCv, and SPHCw control the transistors M1su, M1sv, and M1sw for sensing of a phase(s), in which the brake current Ibrk flows in a sink direction, to be in the ON state, and control the transistors M1su, M1sv, and M1sw for sensing of a phase(s), in which the current flows in a direction opposite to the sink direction, to be in the OFF state.

The sink direction is a direction from the motor driving node to the low potential-side power supply voltage GND. In the example of FIG. 16, it is a direction of the brake current Ibrk in the u-phase. The opposite direction of the sink direction is a direction from the low potential-side power supply voltage GND to the motor driving node. In the example of FIG. 16, it is a direction of the brake current Ibrk in the v-phase and the w-phase. In the motor driving mode, the sense-phase control circuits SPHCu, SPHCv, and SPHCw control the transistors M1su, M1sv, and M1sw for sensing of three phases using the same PWM signals (that is, the gate control signals UL, VL, and WL) as those for the low-side transistors M1u, M1v, and M1w of three phases.

The sense-phase control circuits SPHCu, SPHCv, and SPHCw of three phases specifically include selection circuits SELsu, SELsv, and SELsw of three phases and current direction detection circuits DIRDu, DIRDv, and DIRDw of three phases. Each of the selection circuits SELsu, SELsv, and SELsw of three phases selects ON/OFF control signals (that is, the gate control signals UL, VL, and WL) of the low-side transistors M1u, M1v, and M1w of three phases or a fixed signal (in this case, the ground power supply voltage GND) for controlling the transistor for sensing to be into the OFF state. Each of the selection circuits SELsu, SELsv, and SELsw of three phases controls the transistors M1su, M1sv, and M1sw for sensing of three phases in the respective current sense circuits IDETu, IDETv, and IDETw of three phases, using the selected signal.

The current direction detection circuits DIRDu, DIRDv, and DIRDw of three phases include comparator circuits CMPdu, CMPdv, and CMPdw of three phases which are coupled respectively to the motor driving nodes Nu, Nv, and Nw of three phases and the ground power supply voltage GND, and also NAND calculation circuits Nddu, NDdv, and NDdw of three phases. With this configuration, the current direction detection circuits DIRDu, DIRDv, and DIRDw of three phases detect whether the direction of the brake current Ibrk of three phases is a sink direction or its opposite direction in association with each phase, and output the direction detection signals UDIR, VDIR, and WDIR of three phases as detection results, to the selection circuits SELsu, SELsv, and SELsw of three phases. The current direction detection circuits DIRDu, DIRDv, and DIRDw of three phases output the direction detection signals UDIR, VDIR, and WDIR also to the PWM modulation circuit PWMMD.

In an example of the u-phase, the brake current Ibrk flows in the sink direction, when the voltage level of the output signal OUTt is a positive voltage, and it flows in a direction opposite to the sink direction, when the voltage level is a negative voltage. The comparator circuit CMPdu outputs an "L" level ("0" level), when the voltage level of the output signal OUTu is a positive voltage (that is, when the sink direction is detected), and outputs an "H" level ("1" level), when the voltage level is a negative voltage (that is, when the opposite direction of the sink direction is detected). The NAND calculation circuit NDdu controls the direction detection signal UDIR into the "H" level ("1" level), when a brake ON signal BRKON is at the "L" level (a negate level). The NAND calculation circuit NDdu outputs an inverted signal of an output of the comparator circuit CMPdu as a direction detection signal UDIR, when the brake ON signal BRKON is at the "H" level (an assert level).

As illustrated in FIG. 14, the brake ON signal BRKON is controlled at the "H" level (an assert level) in a period in which short braking is performed (that is, a period in a brake mode), and controlled at the "L" level (a negate level) in a period in which short braking is not performed (that is, a period in a motor driving mode). As a result, in the motor driving mode, the selection circuit SELsu outputs the gate control signal UL as a sense-phase control signal UENA, and controls the transistor M1su for sensing using the same PWM signal as that for the low-side transistor M1u.

In the brake mode, the selection circuit SELsu outputs a gate control signal UL as a sense-phase control signal UENA, when the comparator circuit CMPdu detects the sink direction, and outputs a ground power supply voltage GND as a sense-phase control signal UENA, when the circuit detects the opposite direction of the sink direction. As a result, the selection circuit SELsu controls the transistor M1su for sensing also to be in the ON state, when the low-side transistor M1u in the ON state causes the brake current Ibrk to flow in the sink direction, and controls the transistor M1*su* for sensing to be in the OFF state, when the brake current Ibrk flows in the opposite direction of the sink direction. For the V-phase and the w-phase, the same operation as that for the u-phase is performed.

In the brake mode (that is, the brake ON signal BRKON is at the "H" level), the PWM modulation circuit PWMMD controls the entire low-side transistor M1*u*, M1*v*, and M1*w* of three phases to be in the ON state, thereby causing a brake current Ibrk illustrated in FIG. 16 to flow through the low-side transistor. At this time, in a period in which the brake current Ibrk flows in the sink direction in one phase (for example, only the u-phase), the PWM modulation circuit PWMMD controls only the sense voltage control signal (U1PH) of this one phase to be at the "H" level, of the sense voltage control signals U1PH, V1PH, and W1PH. This period is a one-phase sink period in the brake mode.

In the on-phase sink period, of the transistors M3*su*, M3*sv*, and M3*sw* for sensing in FIG. 3, only the transistor (M3*su*) for sensing of one phase is controlled to be in the ON state. Thus, it is possible to configure the same state as the current sense state in the one-phase sink period, in the motor driving mode illustrated in FIG. 18. As a result, it is possible to detect the brake current Ibrk (for example, the brake current flowing in the u-phase), using the same current sense system as the current sense system illustrated in FIG. 18.

The PWM modulation circuit PWMMD controls the sense voltage control signals U1PH, V1PH, and W1PH of three phases to be at the "L" level, in a period in which the brake current Ibrk flows in the sink direction in two phases (for example, v-phase and w-phase). This period is a two-phase sink period in the brake mode. In the two-phase sink period, the transistors M3*su*, M3*sv*, and M3*sw* for sensing are controlled to be OFF. Then, it is possible to configure the same state as the current sense state in the two-phase sink period in the motor driving mode illustrated in FIG. 19. As a result, it is possible to detect the brake current Ibrk (for example, the brake current flowing in the u-phase) using the same current sense system as the current sense system illustrated in FIG. 19. The PWM modulation circuit PWMMD can discriminate between the one-phase sink period and the two-phase sink period in the brake mode, using the direction detection signals UDIR, VDIR, and WDIR.

<Specific Operation Around Current Sense Circuit (First Embodiment)>

Figure 4:
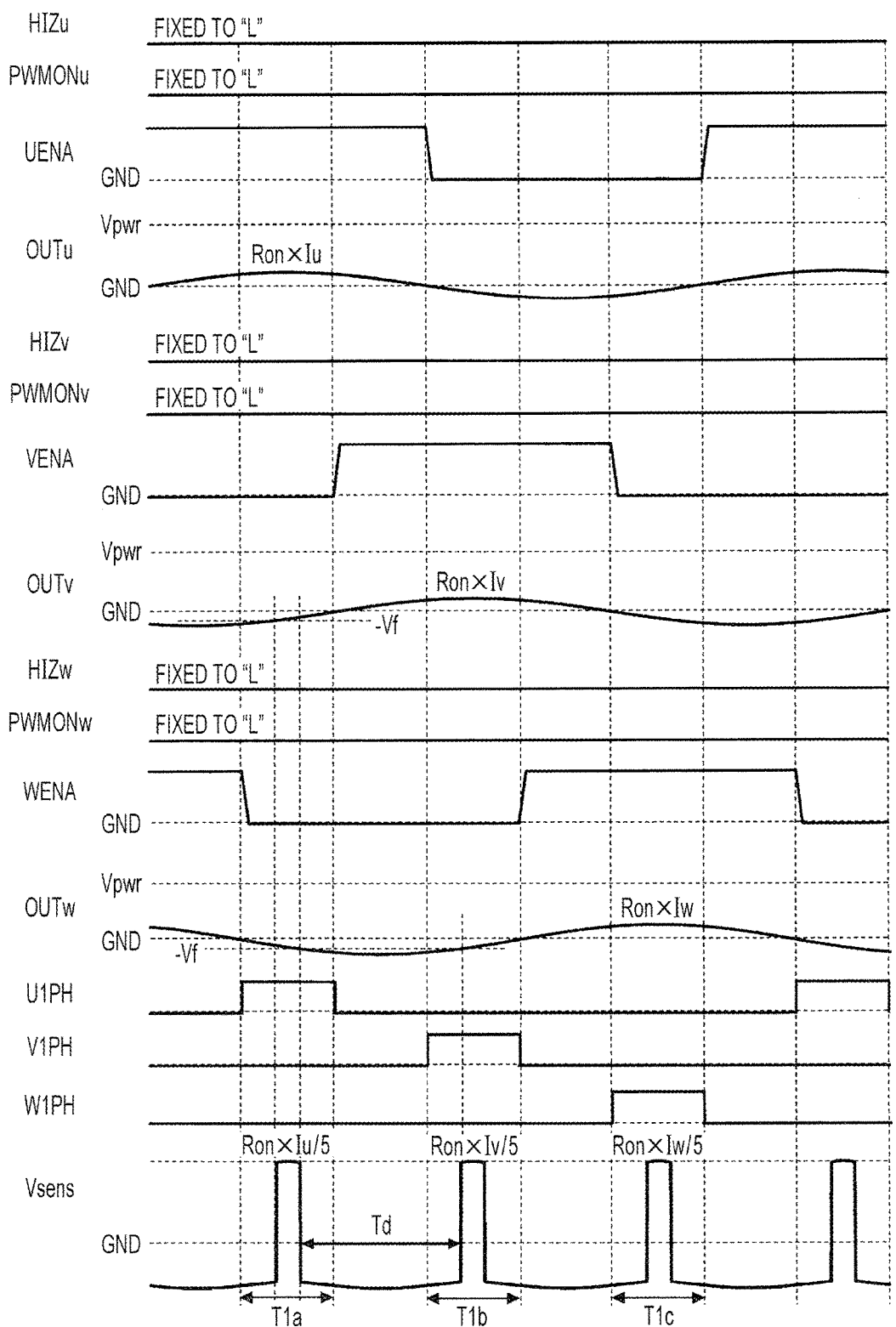
FIG. 4 is a waveform diagram illustrating an operation example when performing current sensing in a brake mode, in FIG. 2 and FIG. 3.

FIG. 4 is a waveform diagram illustrating an operation example when performing current sensing in a brake mode, in FIG. 2 and FIG. 3. In FIG. 4, the high impedance signals HIZu, HIZv, and HIZz of three phases are all at the "L" level, and the PWM ON signals PWMONu, PWMONv, and PWMONw of three phases are also all at the "L" level. As a result, the high-side transistors M0*u*, M0*v*, and M0w are all controlled to be in the OFF state, while the low-side transistors M1*u*, M1*v*, and M1*w* are all controlled to be in the ON state.

The output signals OUTu, OUTv, and OUTw of three phases are AC voltages of three phases around the ground power supply voltage GND. The amplitude of the AC voltages is determined in accordance with the BEMF (VBFu, VBFv, and VBFw of FIG. 16) of each phase corresponding to the rotational speed of the motor SPM and the resistance value of each phase (the resistance value of Lu, Lv, and Lw and the on-resistance value of M1*u*, M1*v*, and M1*w*). The sense-phase control signal UENA is at the "H" level (that is, the voltage level of the gate control signal UL) in a period in which the output signal OUTu is a positive voltage, and is at the "L" level (that is, the ground power supply voltage GND) in a period of the negative voltage, by the sense-phase control circuit SPHCu of FIG. 2. The sense-phase control signals VENA and WENA are the same as the sense-phase control signal UENA.

For example, a period T1*a* of FIG. 4 is a one-phase sink period in which the u-phase is a sink period, because the output signal OUTu is a positive voltage, and the output signals OUTv and OUTw are negative voltages. In this case, of the transistors M1*su*, M1*sv*, and M1*sw* for sensing of three phases, only the transistor Misu for sensing of the sink-phase is controlled to be in the ON state. The PWM modulation circuit PWMMD controls a corresponding sense voltage control signal U1PH to be into the "H" level, due to the one-phase sink period of the u-phase. In accordance with this, the transistor M3*su* for sensing is controlled into the ON state. As a result, the same equivalent circuit as the case of FIG. 20A is formed, and a sense voltage Vsens is "Ron×Iu/5". Similarly, the sense voltage Vsens is "Ron×Iv/5" in a period T1*b* which is the one-phase sink period of the v-phase, and is "Ron×Iw/5" in a period T1*c* which is the one-phase sink period of the w-phase.

<Schematic Configuration and Schematic Operation of Motor Driving Device (First Embodiment)>

Figure 5:
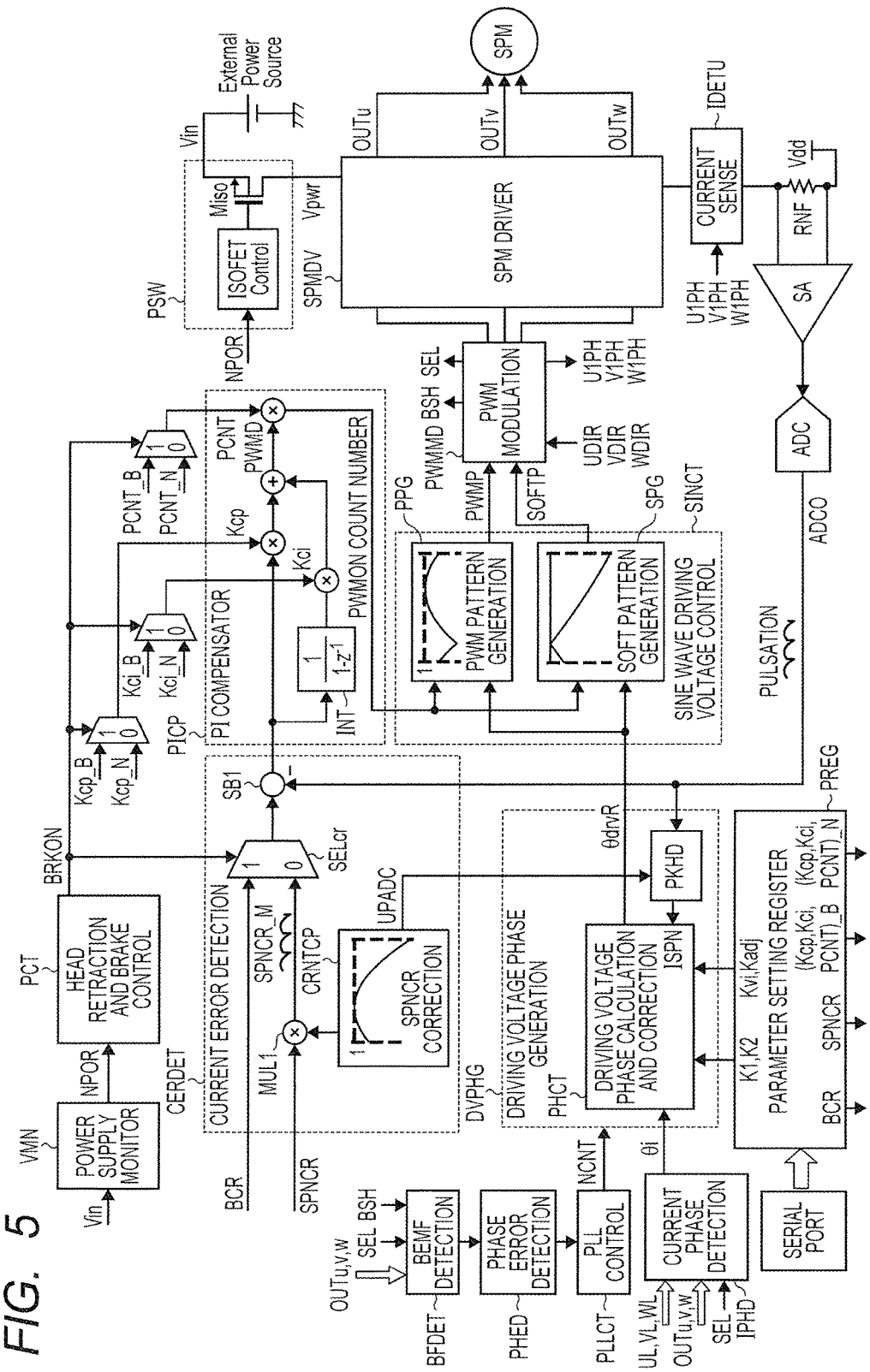
FIG. 5 is a block diagram illustrating a configuration example of the main part of the motor driving device according to the first embodiment of the present invention.

FIG. 5 is a functional block diagram illustrating a configuration example of the main part of the motor driving device according to the first embodiment of the present invention. Descriptions will be focused on a difference from the configuration example of FIG. 14. The motor driving device of FIG. 5 is configured to perform short braking by controlling the brake current Ibrk at the time of short braking, in addition to controlling the driving current in the motor driving mode like the case of FIG. 14. The target value of the brake current Ibrk at this time is different from that in the motor driving mode, and needs to be set in consideration of the ASO of the driving transistor. Thus, to the current error detection circuit CERDET, a current instruction value BCR for brake mode is input, in addition to the current instruction value SPNCR for motor driving mode. Each of the current instruction values SPNCR and BCR is set by the parameter setting register PREG.

The current error detection circuit CERDET includes a selection circuit SELcr which selects one of the current instruction value SPNCR and the current instruction value BCR, in accordance with a brake ON signal BRKON (that is, the motor driving mode or the brake mode). In the brake mode, the subtracter SB1 detects an error between a digital value ADCO from the analog/digital converter ADC and the current instruction value BCR from the selection circuit SELcr. The digital value ADCO is a value based on the current detection result (a sense voltage Vsens) output from the current detection node Nsens, and is a value proportional to the magnitude of the brake current Ibrk in the case of the brake mode.

The PI compensator PICT sets a duty (in this case, the PWM ON count number) of the PWM signal, based on the error detected by the current error detection circuit CERDET. In the motor driving mode, the high-side transistor of each phase and the low-side transistor are appropriately PWM-controlled. On the contrary, in the brake mode, the low-side transistor of each phase is controlled to be ON. The characteristics of the current control loop are different between the motor driving mode and the brake mode, in accordance with the difference of the control methods.

To the PI compensator PICP, the PWM cycle count number PCNT_N for normal use (that is, for the motor driving mode) or the PWM cycle count number PCNT_B for brake mode is selectively input. Further, to the PI compensator PCIP, various control gains (in this case, a proportional gain Kcp_N and an integration gain Kci_N) for normal use (that is, for the motor driving mode) or various control gains (in this case, a proportional gain Kcp_B and an integration gain Kci_B) for brake mode are selectively input. For these selections are performed using the brake ON signal BRKON. Each of the values (PCNT_N, PCNT_B, Kcp_N, Kci_N, Kcp_B, and Kci_B) is set by the parameter setting register PREG. For example, the PWM cycle count number PCNT_B for brake mode is set greater (in other words, PWM cycle is longer) than the PWM cycle count number PCNT_N for normal use.

In the brake mode, the sine wave driving voltage control circuit SINCT is non-activated, and a PWM ON count number from the PI compensator PICP is output as is to the PWM modulation circuit PWMMD. The driving voltage phase generation circuit DVPHG is also non-activated. The PWM modulation circuit PWMMD controls the ratio of a period in which the low-side transistors M1$u$, M1$v$, and M1$w$ of three phases are all controlled to be ON and a period in which they are all controlled to be OFF, in the PWM period based on the PWM cycle count number PCNT_B, based on the PWM ON count number (that is, duty) from the PI compensator PICP. The brake current Ibrk is controlled to approach the current instruction value BCR for brake mode, by a current control loop including the PWM control.

In the example of FIG. 5, unlike the case of FIG. 14, the brake ON signal BRKON is not input to the PWM modulation circuit PWMMD. As obvious from FIG. 2, it is because the state of the brake ON signal BRKON can be identified by the direction detection signals UDIR, VDIR, and WDIR. That is, if the brake ON signal BRKON is at the "L" level (that is, the motor driving mode), the direction detection signals UDIR, VDIR, and WDIR are all at the "H" level. On the contrary, if the brake ON signal BRKON is at the "H" level (that is, the brake mode), one or more of the direction detection signals UDIR, VDIR, WDIR is at the "L" level.

Figure 6:
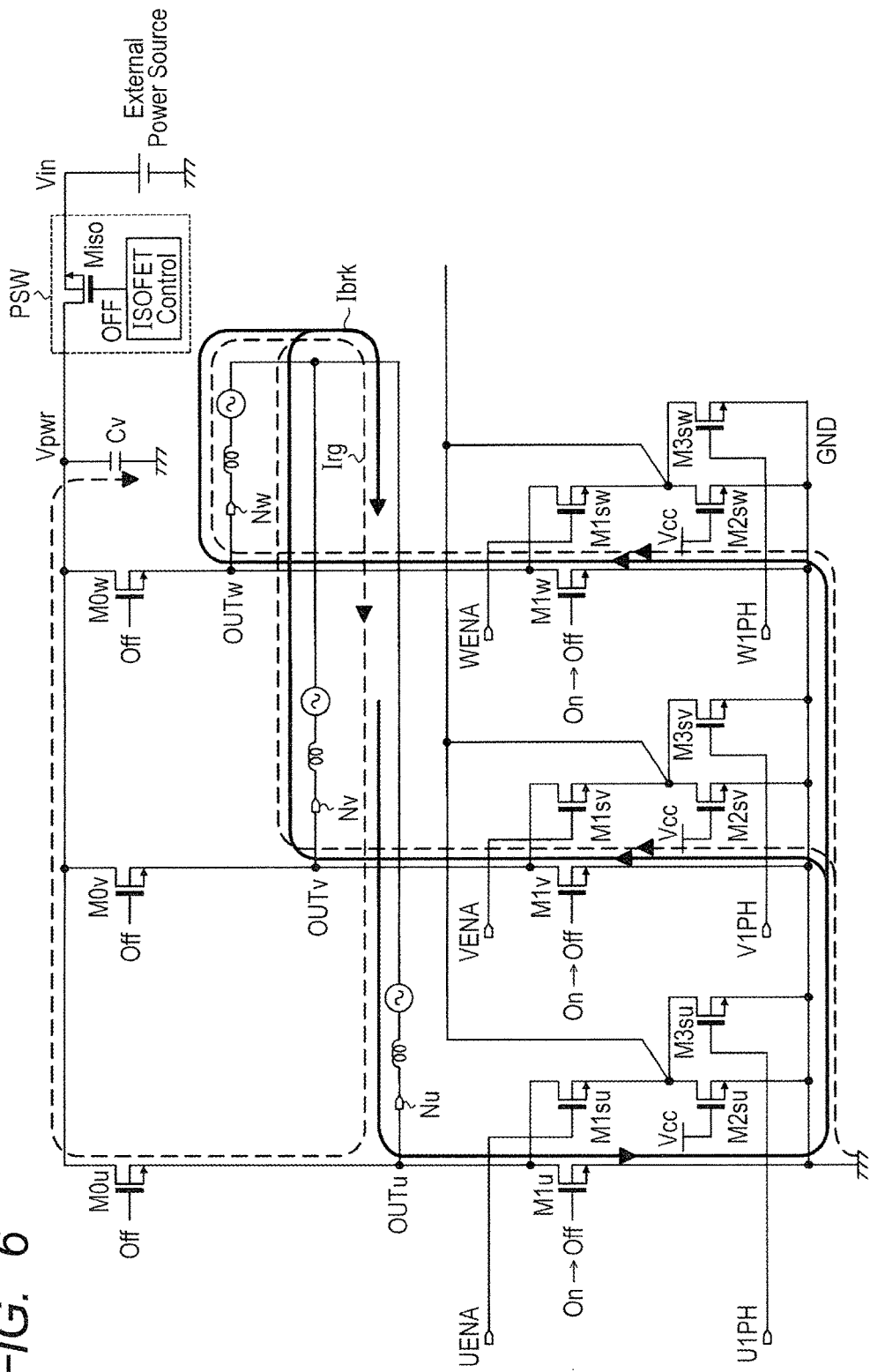
FIG. 6 is a diagram for explaining an operation example of PWM control in the brake mode in FIG. 5.

FIG. 6 is a diagram for explaining an operation example of PWM control in the brake mode in FIG. 5. In each PWM cycle, in a period in which the low-side transistors M1$u$, M1$v$, and M1$w$ of three phases are all controlled to be in the ON state, the same brake current Ibrk as that of FIG. 16 flows, as illustrated in FIG. 6. In a period in which the low-side transistors M1$u$, M1$v$, and M1$w$ of three phases are controlled to be in the OFF state, a regenerative current Irg illustrated in FIG. 6 flows. This regenerative current Irg flows through the internal power supply voltage Vpwr (its power supply capacity Cv) through the reflux diode of the high-side transistor M0$u$ of the sink-phase (in this case, u-phase). The operation power in the brake mode is obtained by the internal power supply voltage Vpwr generated in accordance with the regenerative current Irg.

<Details of Pre-Driver Circuit>

Figure 7:
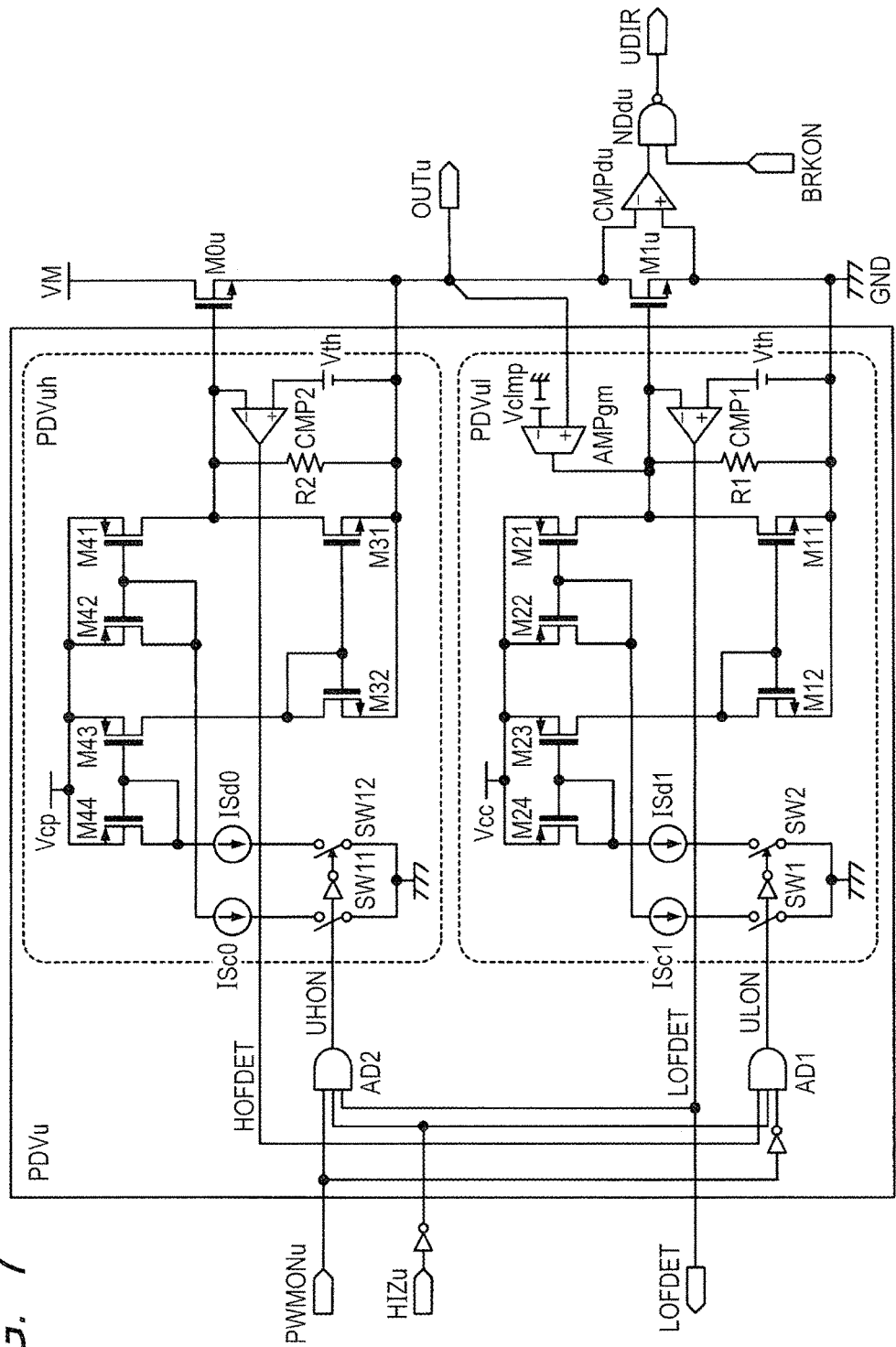
FIG. 7 is a circuit diagram illustrating a specific configuration example of a pre-driver circuit in FIG. 2.

FIG. 7 is a circuit diagram illustrating a specific configuration example of the pre-driver circuit in FIG. 2. The u-phase pre-driver circuit PDVu of FIG. 2 is described as an example. The pre-driver circuit PDVu illustrated in FIG. 7 includes a high-side pre-driver PDVuh driving the high-side transistor M0$u$, a low-side pre-driver PDVu1 driving the low-side transistor M1$u$, and AND calculation circuits AD1 and AD2.

In the high-side pre-driver PDVuh, a current source ISc0 and current mirror circuits (in this case, pMOS transistors M41 and M42) coupled to the current source IsC0 charge the gate of the high-side transistor M0$u$, in accordance with assertion of the high-side ON signal UHON. The current source ISd0, the current mirror circuits (in this case, pMOS transistors M43 and M44) coupled to the current source ISd0, and current mirror circuits (in this case, nMOS transistors M31 and M32) returning the current discharge the gate of the high-side transistor M0$u$, in accordance with the negate of the high-side ON signal UHON. The comparator circuit CMP2 detects ON/OFF of the high-side transistor M0$u$, and assets a high-side OFF detection signal HOFDET, when it is in the OFF state.

In the low-side pre-driver PDVu1, the current source ISc1 and the current mirror circuits (in this case, pMOS transistors M21 and M22) coupled to the current source ISc1 charge the gate of the low-side transistor M1$u$, in accordance with assertion of the low-side ON signal ULON. The current source ISd1, current mirror circuits (in this case, pMOS transistors M23 and M24) coupled to the current source ISd1, and current mirror circuits (in this case, nMOS transistors M11 and M12) returning the current discharge the gate of the low-side transistor M1$u$, in accordance with the negate of the low-side ON signal ULON. The comparator circuit CMP1 detects ON/OFF of the low-side transistor M1$u$, and asserts a low-side OFF detection signal LOFDET, when it is in the OFF state.

The AND calculation circuit AD asserts the high impedance signal HIZu, when the PWM ON signal PWMONu is at the "H" level, when the low-side OFF detection signal LOFDET is asserted, and when the high impedance signal HIZu is at the "L" level (a negate level). On the other hand, the AND calculation circuit AD1 asserts the low-side ON signal ULON, when the PWM ON signal PWMONu is at the "L" level, when the high-side OFF detection signal HOFDET is asserted, and when the high impedance signal HIZu is at the "L" level (a negate level).

It is possible to appropriately set a switching time of the high-side transistor M0$u$ and the low-side transistor M1$u$, in accordance with the control using the current source and the current mirror circuits. When the PWM ON signal PWMONu shifts, the high-side transistor M0$u$ and the low-side transistor M1$u$ can be driven by providing a dead time (that is, by preventing that both are simultaneously ON).

If the high impedance signal HIZu is at the "H" level (an assert level), the high-side transistor M0$u$ and the low-side transistor M1$u$ are both controlled to be in the OFF state. For example, when performing the PWM control illustrated in FIG. 6, the PWM modulation circuit PWMMD controls the PWM ON signal PWMON of each of the phases (u, v, and w) to be in the "L" level, to cause the brake current Ibrk to flow, and controls the high impedance signal HIZ of each of the phases (u, v, and w) to be in the "H" level, to cause the regeneration current Irg to flow.

In the low-side pre-driver PDVu1, further, there are ☐ provided a current amplifier circuit AMPgm and a clamp circuit including a resistance element R1. The current amplifier circuit AMPgm monitors a voltage (that is, an output signal OUTu) of the motor driving node Nu of the u-phase, and causes a predetermined current to flow through the resistance element R1, when this voltage gets greater than a judgment voltage Vclmp, thereby controlling the low-side transistor M0$u$ to be into the ON state. The clamp circuit is provided similarly also for the v-phase and the w-phase.

For example, if the PWM control is performed as illustrated in FIG. 6, the internal power supply voltage Vpwr is excessively increased by the uncontrolled regenerative current Irg. This results in an undesirable case in which it deviates from the ASO of the driving transistor. The clamp circuit of each of the phases controls the low-side transistor of a corresponding phase to be ON, if the voltage level of the output signal of the corresponding phase gets greater than the judgment voltage Vclmp, thereby operating in a manner to suck the regenerative current Irg causing a voltage increase. As a result, it is possible to suppress an excess increase in the internal power supply voltage Vpwr, and to improve the safety of the driving transistor.

<Main Effect of First Embodiment>

By using the motor driving device of the first embodiment, representatively, it is possible to detect a brake current at the time of short braking, and it is also possible to control the brake current based on the detection result. As a result, it is possible to quickly stop the motor SPM, while keeping an operating point of the driving transistor in the ASO at the time of short braking. That is, it is possible to safely and quickly stop the motor SPM. Further, it is possible to control the brake current by diverting each of the circuits (the current sense circuit unit IDETU or the current control loop) in accordance with control of the driving current of the motor SPM. Thus, it is possible to suppress an increase in the area overhead.

Second Embodiment

<Assumed Problem>

For example, when a current sense circuit illustrated in FIG. 3 is used, to normally detect a brake current using the sense voltage Vsens, it is necessary to control the transistors M1su, M1sv, and M1sw for sensing to be normally into an OFF state. That is, for example, in a period Td illustrated in FIG. 4, the voltage level of the output signal OUTw of the w-phase is lower than a threshold voltage Vf of the transistor M1sw for sensing. As a result, originally, the transistor M1sw for sensing which needs to be controlled into the OFF state is undesirably in an ON state. In this period Td, it may be difficult to normally detect the brake current.

If this period Td extends, conversely, the period in which the brake current can normally be detected gets small. Thus, it undesirably results in that the design of the detection timing is complicated. Further, the period Td includes the peak of the negative voltage side of the voltage amplitude of the output signal OUTw. To control the brake current with high accuracy, it is desired to perform detection even in the position of the peak on the negative voltage side, in addition to the position of the peak of the positive voltage side. The brake current may normally be detected even in the period Td, in accordance with the relation between the voltage amplitude of the output signal OUTw at the time of short braking and the threshold voltage Vf of the transistor M1sw for sensing. In general, it is reasonably considered that detection may be difficult.

<Specific Configuration Around Current Sense Circuit (Second Embodiment)>

Figure 8:
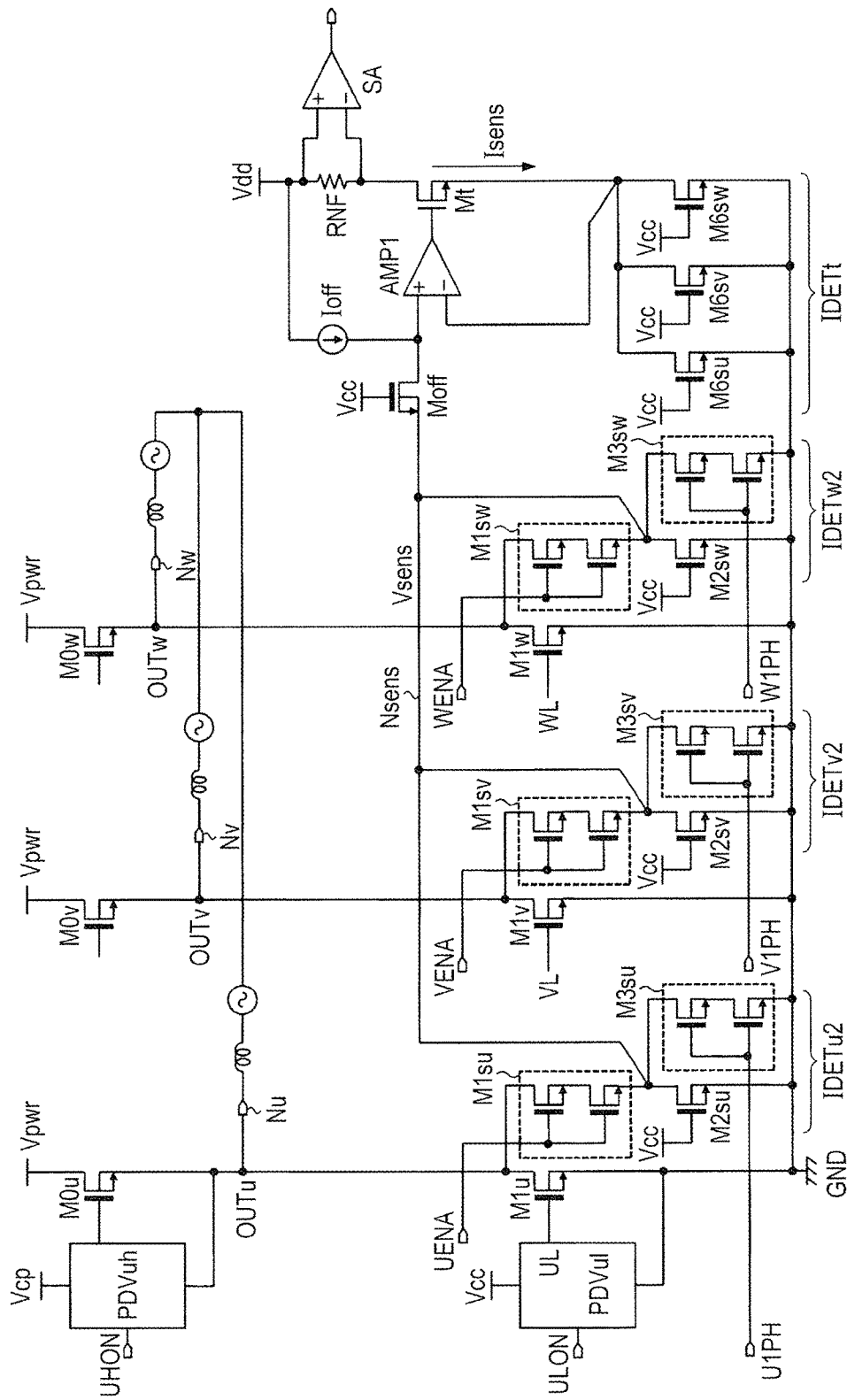
FIG. 8 is a circuit diagram illustrating a specific configuration example around a current sense circuit, in a motor driving device according to a second embodiment of the present invention.

FIG. 8 is a circuit diagram illustrating a specific configuration example around a current sense circuit, in the motor driving device according to a second embodiment of the present invention. The configuration example of FIG. 8 differs from the configuration example illustrated in FIG. 3, in the following points. Each of the transistors M1su, M1sv, and M1sw for sensing of three phases is configured with a plurality of (in this case, two) transistors which are coupled in series. Each of the transistors M3su, M3sv, and M3sw for sensing of three phases is also configured with the same number (two) transistors M1su, M1sv, and M1sw for sensing of three phases which are coupled in series. Further, each of the transistors M2su, M2sv, and M2sw for sensing of three phases is configured with one transistor, but may be configured with a plurality of transistors which are coupled in series.

It is assumed that the number of serial coupling of the transistors M1s (u, v, and w) for sensing and the transistors M3s (u, v, and w) for sensing is represented as "a", and the number of serial coupling of the transistors M2s (u, v, and w) for sensing is represented as "b". It is also assumed a case in which a current (a driving current or a brake current) is detected in a one-phase sink period of u-phase. In this case, in the equivalent circuit of FIG. 20A, each of the transistors M1su and M3su for sensing is assumed as a resistance element of "a×R" ("R" is on-resistance of one transistor), and each of the transistors M2s (u, v, and w) for sensing is assumed as a resistance element of "b×R". As a result, the sense voltage Vsens is "Ron×Iu×{b/(2b+3a)}".

It is assumed a case in which a current (a driving current or a brake current) is detected in a two-phase sink period of v-phase and w-phase. In this case, in the equivalent circuit of FIG. 20B, each of the transistors M1sv and M1sw for sensing is assumed as a resistance element of "a×R", and each of the transistors M2s (u, v, and w) for sensing is assumed as "b×R". As a result, the sense voltage Vsens is "Ron×(Iv+Iw)×{b/(2b+3a)}". The modified expression is "Ron×Iu×{b/(2b+3a)}". In this manner, to obtain the same sense voltage Vsens both in the one-phase sink period and the two-phase sink period, it is necessary that the number of serial coupling of the transistors M1s (u, v, and w) for sensing is the same as the number of serial coupling of the transistors M3s (u, v, and w) for sensing.

In the example of FIG. 8, "a=2" and "b=1". Thus, the sense voltage Vsens, in the one-phase sink period of u-phase or in the two-phase sink period of v-phase and w-phase, is "Ron×Iu/8". In this case, the sense current Isens is "3×Iu/ (8×m)", when the transistor size ratio of transistors M6su, M6sv, and M6sw for sensing is "1/m" of the low-side transistor.

<Specific Operation Around Current Sense Circuit (Second Embodiment)>

Figure 9:
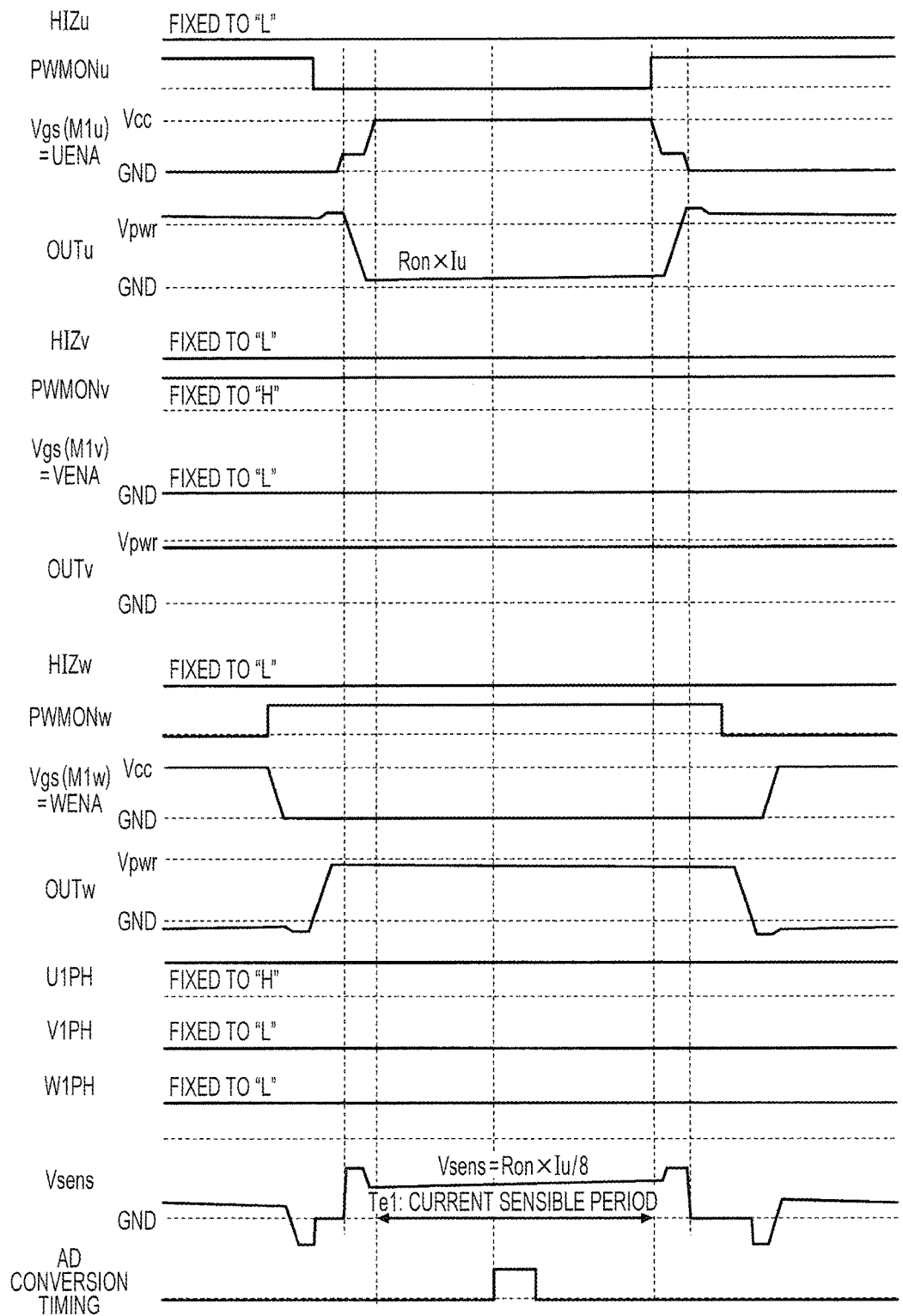
FIG. 9 is a waveform diagram illustrating an operation example when performing current sensing in a motor driving mode in FIG. 8.

FIG. 9 is a waveform diagram illustrating an operation example when performing current sensing in a motor driving mode. Like the case of FIG. 18, FIG. 9 illustrates an operation example in the one-phase sink period of u-phase. The waveform of FIG. 9 is substantially the same as the waveform of FIG. 18. The differences therebetween are that sense-phase control signals UENA, VENA, and WENA are the same voltage as the gate-source voltage Vgs of the respective low-side transistors M1u, M1v, and M1w, and that the sense voltage Vsens in the current sensible period Te1 is "Ron×Iu/8". Though no illustration is made, the waveform of the two-phase sink period is also substantially the same as the waveform of FIG. 19.

Figure 10:
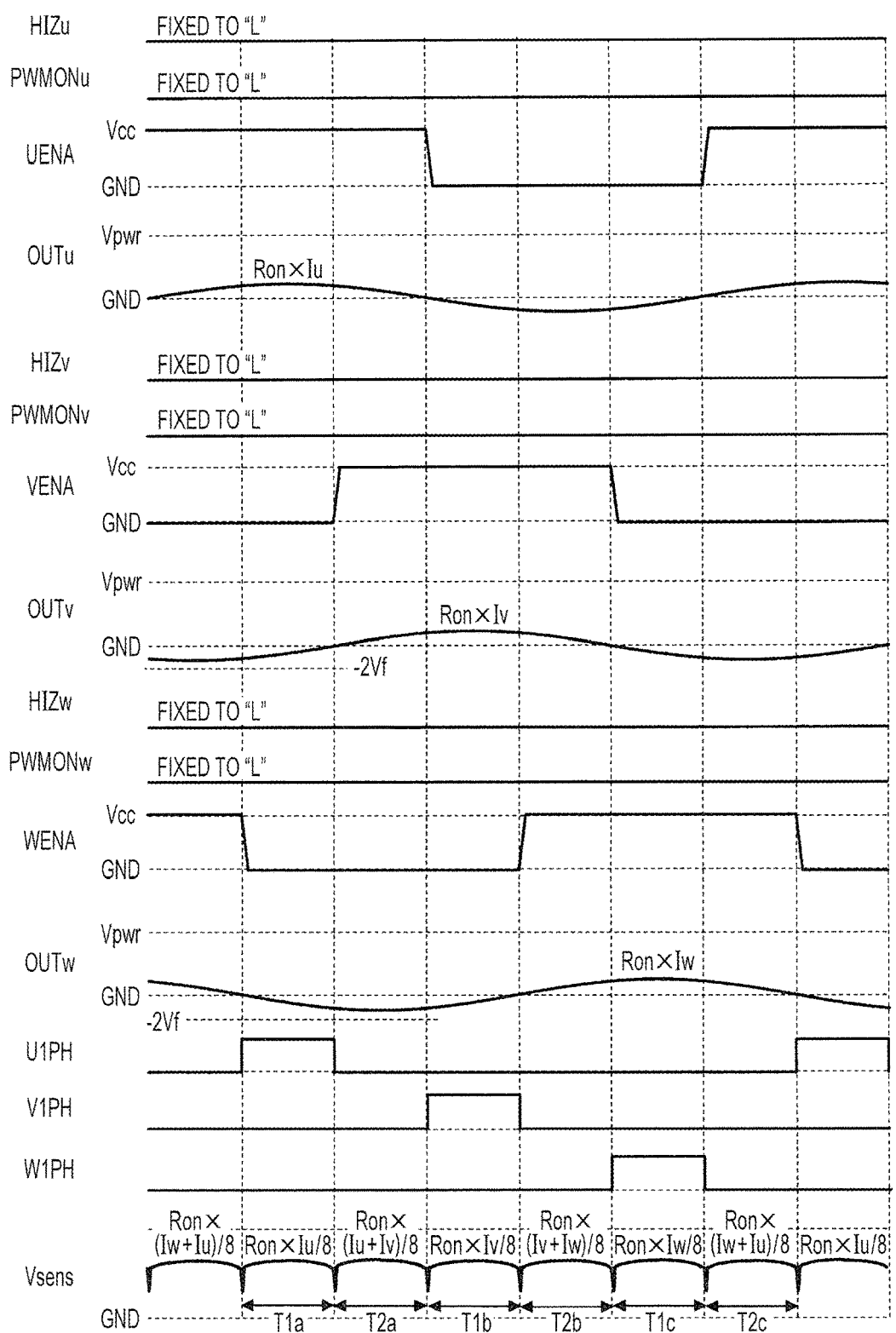
FIG. 10 is a waveform diagram illustrating an operation example when performing current sensing in a brake mode in FIG. 8.

FIG. 10 is a waveform diagram illustrating an operation example when performing current sensing in a brake mode. The waveform illustrated in FIG. 10 differs from the waveform of FIG. 4, in a point that it can be obtained substantially in the entire periods of the normal sense voltage Vsens and a point that the sense voltage Vsens is, for example, "Ron× Iu/8". That is, in FIG. 8, each of the transistors M1s (u, v, and w) for sensing is configured with two transistors which are coupled in series. Thus, unlike the case of FIG. 4, it is possible to obtain the normal sense voltage Vsens, unless the voltage level of each of the output signals OUTu, OUTv, and OUTw is lower than "−2×Vf".

For example, periods T2a, T2b, and T2c in FIG. 10 are periods in which the normal sense voltage Vsens cannot be obtained in FIG. 4. The periods T2a, T2b, and T2c are all two-phase sink periods in which respectively "(Iu+Iv)=Iw", "(IV+IW)=Iu", and "(Iw+Iu)=Iv" are detected. In the periods T2a, T2b, and T2c, the sense voltage control signals U1PH, V1PH, and W1PH are all controlled at the "L" level.

For example, at the boundary of the period T1a and the period T2a of FIG. 10, the direction of the brake current is changed, thus switching of the transistors for sensing. Thus, in the period of this boundary, the normal sense voltage Vsens cannot be obtained. However, it is a very short period. Thus, it is substantially possible to obtain the normal sense voltage Vsens in also the entire periods of the electrical angle of 360 degrees. In the period of this boundary, sampling of the analog/digital converter ADC is not performed.

<Main Effect of Second Embodiment>

The same effect as the case of the first embodiment can be obtained, by using the motor driving device of the second embodiment. Further, unlike the case of the first embodiment, it is possible to extend the period in which the brake current can be detected, for example to control the brake current with high accuracy.

Third Embodiment

<Schematic Configuration and Schematic Operation of Motor Driving Device (Third Embodiment)>

Figure 11:
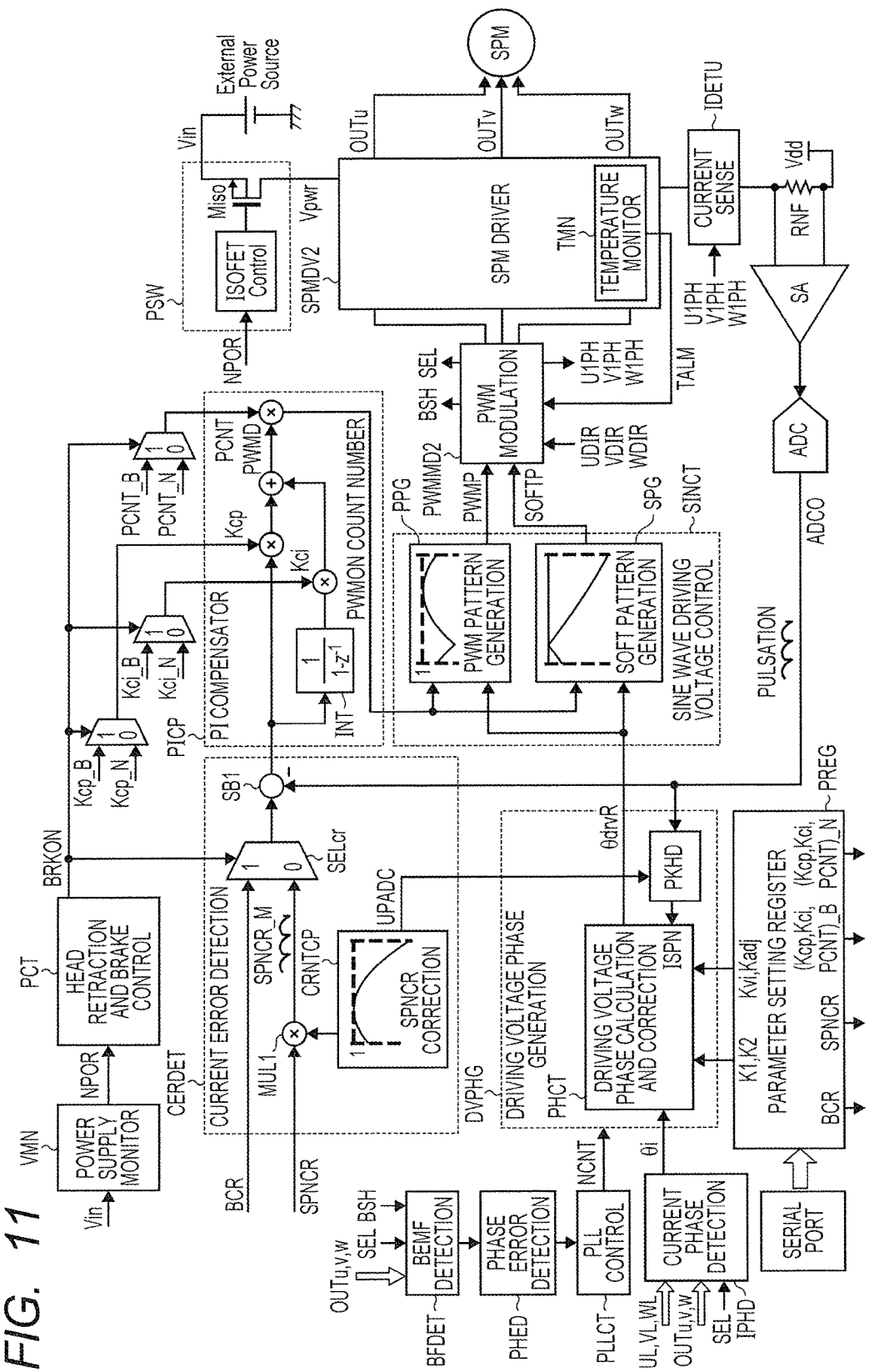
FIG. 11 is a functional block diagram illustrating a configuration example of the main part of a motor driving device according to a third embodiment of the present invention.

FIG. 11 is a functional block diagram illustrating a configuration example of the main part of the motor driving device according to a third embodiment of the present invention. This motor driving device is applicable to the motor driving device of the first and second embodiments. Unlike the configuration example of FIG. 5, in the motor driving device illustrated in FIG. 11, an SPM driver SPMDV2 includes a temperature monitor circuit TMN, resulting in a slight difference in operations of a PWM modulation circuit PWMMD2.

For example, by providing the clamp circuit illustrated in FIG. 7 of the first embodiment, it is possible to suppress an excess increase in the internal power supply voltage Vpwr, for example, to prevent a case in which the maximum voltage of the driving transistor deviates from the ASO. By performing an operation by the clamp circuit, the low-side transistor (for example, M1u of FIG. 7) of a corresponding phase is controlled to be in the ON state in a state where a drain-source voltage is high, resulting in very great consumption power. As a result, in the low-side transistor, even if the maximum voltage is within the ASO, the maximum temperature may undesirably deviate from the ASO. For this context, the temperature monitor circuit TMN is provided.

The temperature monitor circuit TMN monitors the temperature of the low-side transistors M1u, M1v, and M1w of three phases, and asserts an alarm signal TALM, when the temperature gets greater than a predetermined "H"-side judgment temperature. After this, when the temperature gets lower than the "L"-side judgment temperature, the circuit negates the alarm signal TALM. Assertion of the alarm signal TALM implies an instruction for interruption the brake mode. Then, the PWM modulation circuit PWMMD2 interrupts the brake mode, controls the high-side transistors M0u, M0v, and M0w and the low-side transistors M1u, M1v, and M1w to be into the OFF state, and keeps this state. That is, the PWM modulation circuit PWMMD2 is in a wait state until the over-temperature is solved. The negate of the alarm signal TALM implies an instruction for restarting the brake mode. In response to this, the PWM modulation circuit PWMMD2 restarts the brake mode.

<Scheme of Temperature Monitor Circuit>

Figure 12:
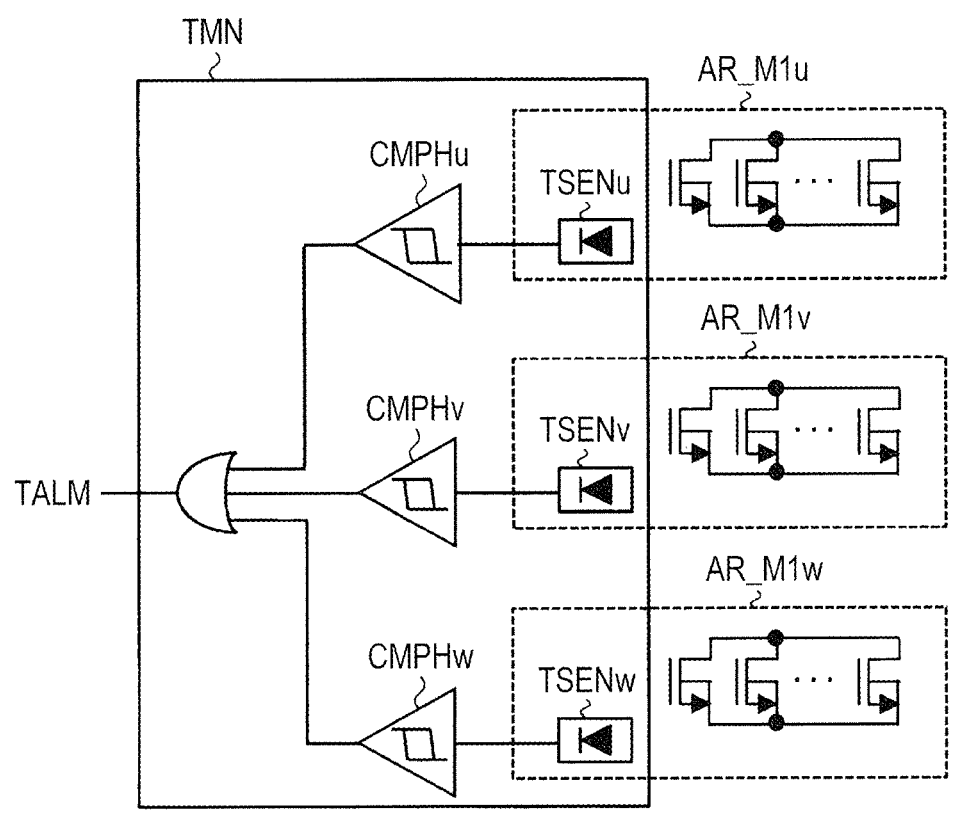
FIG. 12 is a pattern diagram illustrating a schematic configuration example of a temperature monitor circuit in FIG. 11.

FIG. 12 is a pattern diagram illustrating a schematic configuration example of a temperature monitor circuit in FIG. 11. For example, temperature sensors TSENu, TSENv, and TSENw of three phases are provided respectively in formation areas AR_M1u, AR_M1v, and AR_M1w of the low-side transistor of three phases, or in forms adjacent to each of the formation areas. Each of the temperature sensors TSENu, TSENv, and TSENw is a PTAT (Proportional To Absolute Temperature) circuit which generates a voltage which increases proportionally to the temperature, using, for example, the diode.

Hysteresis comparators CMPHu, CMPHv, and CMPHw of three phases judge voltages respectively from the temperature sensors TSENu, TSENv, and TSENw of three phases. For example, the hysteresis comparator circuit CMPHu outputs an "H" level, when the voltage from the temperature sensor TSENu is greater than the "H"-side judgment voltage, and outputs an "L" level, when it is lower than the "L"-side judgment voltage (<"H"-side judgment voltage). The alarm signal TALM is generated by performing an OR calculation for the output of each of the hysteresis comparators CMPHu, CMPHv, and CMPHw of three phases. As a result, the temperature monitor circuit TMN alerts the alarm signal TALM, when there is at least one over-heated low-side transistor, and negates the alarm signal TALM at the stage where there is no over-heated low-side transistor.

<Main Effect of Third Embodiment>

Accordingly, the same effect as that of the first and second embodiments can be obtained by using the motor driving device of the third embodiment. Further, as compared with the case of the first embodiment, it is possible to increase the safety of the driving transistor, and to safely stop the motor SPM.

Fourth Embodiment

<Schematic Configuration and Schematic Operation of Motor Driving Device (Fourth Embodiment)>

Figure 13:
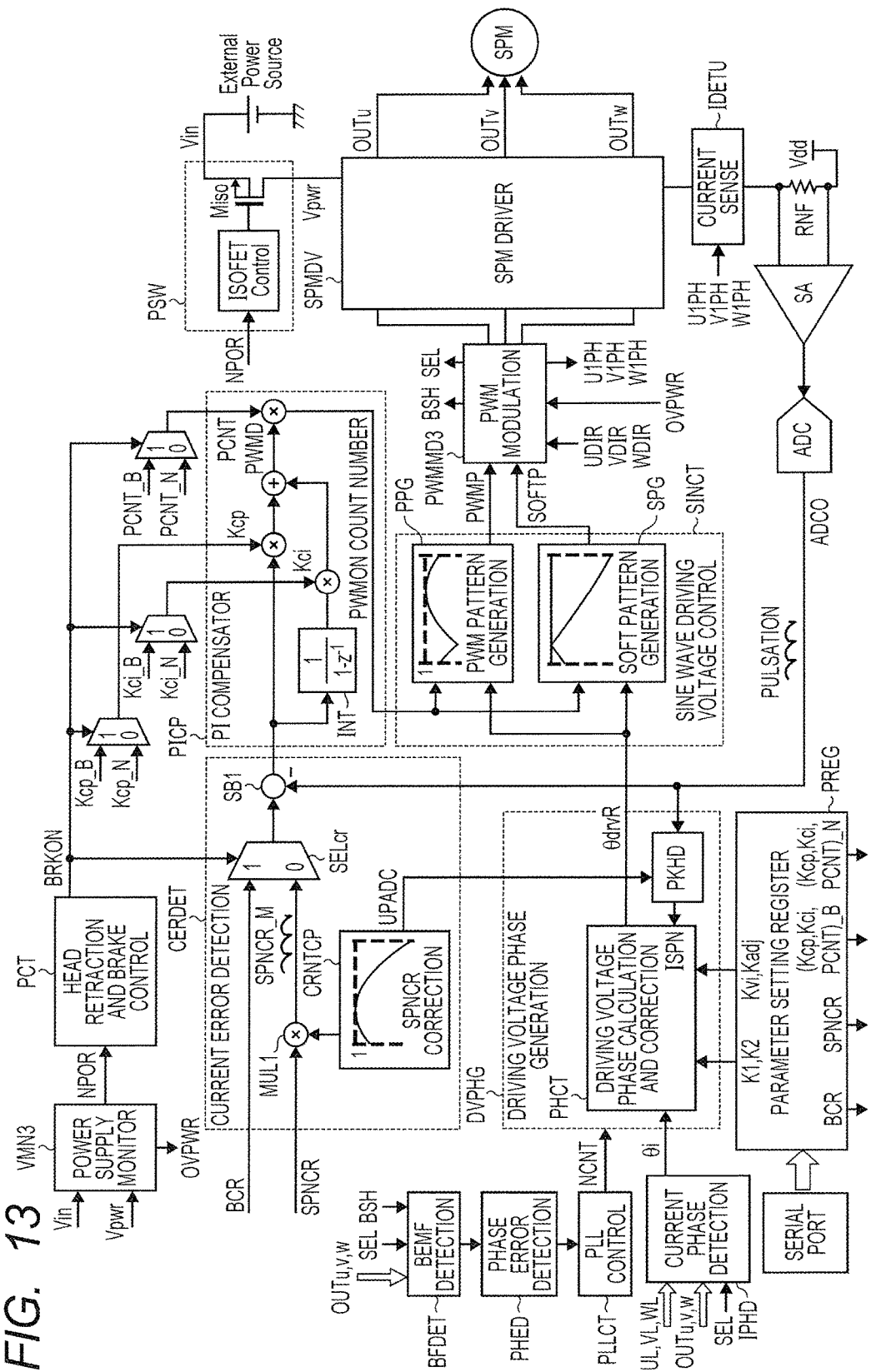
FIG. 13 is a functional block diagram illustrating a configuration example of the main part of a motor driving device according to a fourth embodiment of the present invention.

FIG. 13 is a functional block diagram illustrating a configuration example of the main part of a motor driving device according to a fourth embodiment of the present invention. The motor driving device illustrated in FIG. 13 slightly differs from the configuration example of FIG. 5, in an operation of a power supply monitor circuit VMN3 and an operation of a PWM modulation circuit PWMMD3 in accordance with the operation. The power supply monitor circuit VMN3 monitors the internal power supply voltage Vpwr in addition to the external power supply voltage Vin, asserts an over-voltage detection signal OVPWR when the internal power supply voltage Vpwr gets greater than a predetermined "H"-side judgment voltage, and negates the over-voltage detection signal OVPWR when it is lower than the "L"-side judgment voltage. Thus, the power supply monitor circuit VMN3 includes a hysteresis comparator circuit which performs a judgment operation, using the "H"-side judgment voltage and the "L"-side judgment voltage (<"H"-side judgment voltage), like the case of, for example, the third embodiment. The "H"-side judgment voltage is determined based on, for example, the maximum rated voltage of the ASO.

Assertion of the over-voltage detection signal OVPWR implies an instruction for interrupting the brake mode. In response to this, the PWM modulation circuit PWMMD3 interrupts the brake mode, controls the high-side transistors M0u, M0v, and M0w and the low-side transistors M1u, M1v, and M1w to be into the OFF state, and keeps this state. That is, the PWM modulation circuit PWMMD3 is in await state until the over-voltage is solved. Negation of the over-voltage detection signal OVPWR implies an instruction for restarting the brake mode. In response to this, the PWM modulation circuit PWMMD3 restarts the brake mode.

<Main Effect of Fourth Embodiment>

Accordingly, the same effect as that of the first, second, and third embodiments can be obtained by using the motor driving device of the fourth embodiment. Further, the safety of the driving transistor may possibly be increased, without using the clamp circuit described in FIG. 7 of the first embodiment or the temperature monitor circuit described in the third embodiment. As a result, it may be possible to suppress an increase in the area overhead. That is, the same purpose of the case of the clamp circuit may be attained by providing the power supply monitor circuit VMN3. Excessive heat of the low-side transistor of the third embodiment is hardly generated by not providing the clamp circuit.

The invention by the present inventors has specifically been described based on the preferred embodiments. The present invention is not limited to the preferred embodiments, and various changes may be made without departing from the scope thereof. For example, above-described embodiments have specifically been described for easy description of the present invention, and are not to limit to any of those including the entire above-described configuration. A part of the configuration of one embodiment may possibly be replaced by the configuration of another embodiment, and the configuration of one embodiment may be added to the configuration of another embodiment. A part of the configuration of each embodiment may be added to, deleted from, or replaced by the configuration of another embodiment.

For example, the systems of the preferred embodiments are not limited to the HDD, and are applicable as a driving method of various motors. Specific examples thereof include a DVD reproducing/recording device, Blu-ray reproducing/recording device, and the like. In some case, it is applicable as a technique for quickly and safely stopping the motor in the inverter system of air-conditioners.

What is claimed is:

1. A motor driving device which drives a three-phase motor which is externally provided, device comprising:
   drivers of three phases which include high-side transistors of three phases coupled between a high potential-side power supply voltage and motor driving nodes of three phases and low-side transistors of three phases coupled between a low potential-side power supply voltage and the motor driving nodes of three phases;
   current sense circuits of three phases which detect magnitude of a current flowing through the low-side transistors of three phases, and output a current detection result to a current detection node provided commonly to the three phases;
   sense-phase control circuits of three phases; and
   a PWM (Pulse Width Modulation) modulation circuit which controls the drivers of three phases and the current sense circuits of three phases,
   wherein each of the current sense circuits of three phases includes
      first transistors which are coupled between the motor driving node of a corresponding phase and the current detection node,
      a second transistor which is coupled between the current detection node and the low potential-side power supply voltage, and fixed into an ON state, and
      third transistors which are coupled between the current detection node and the low potential-side power supply voltage,
   wherein, in a first operation mode for causing a brake current to flow through the drivers of three phases, when a direction from the motor driving node to the low potential-side power supply voltage is assumed as a first direction, the sense-phase control circuits of three phases control the first transistor of a phase in which the brake current flows in the first direction to be into an ON state, and control the first transistor of a phase in which it flows in a second direction opposite to the first direction to be into an OFF state, and
   wherein the PWM modulation circuit executes, in the first operation mode,
      a first process for controlling the low-side transistors of three phases to be all into an ON state, and
      a second process for controlling, in a period in which the brake current flows in the first direction in one phase, only the third transistor of the one phase to be into an ON state, of the third transistors of three phases, and for controlling the three transistors of three phases to be all into an OFF state, in a period in which it flows in the first direction in two phases.

2. The motor driving device according to claim 1,
wherein, in a second operation mode for causing a driving current to flow through the drivers of three phases, the PWM modulation circuit executes
   a third process for controlling the high-side transistors of three phases and the low-side transistors of three phases, using a PWM signal, and
   a fourth process for controlling, in a period in which the driving current flows in the first direction in one phase, only the third transistor of the one phase of the third transistors of three phases, and for controlling, in a period in which it flows in the first direction in two phases, the third transistors of three phases all into an OFF state,
wherein the sense-phase control circuits of three phases respectively control the first transistors of three phases using a same PWM signal as that of the low-side transistors of three phases, in the second operation mode.

3. The motor driving device according to claim 2,
wherein the sense-phase control circuits of three phases have selection circuits of three phases, which select an ON/OFF signal of the low-side transistors of three phases or a fixed signal for controlling the first transistors to be into an OFF state and control the first transistors of three phases to be ON/OFF using a selected signal.

4. The motor driving device according to claim 3,
wherein the sense-phase control circuits of three phases further are coupled to the motor driving nodes and the low potential-side power supply voltage, detect if a direction of each of the brake currents of three phases is the first direction or the second direction in association with each phase, and have current direction detection circuits of three phases which output a detection result to the selection circuits of three phases.

5. The motor driving device according to claim 1,
wherein the first transistors are configured with a plurality of transistors coupled in series, and
wherein the third transistors are configured with a same number of transistors as those of the first transistors, and are coupled in series.

6. The motor driving device according to claim 2, further comprising:
an error detection circuit which detects an error between the current detection result output to the current detection node and a predetermined current instruction value; and
a compensator which includes an integrator, and sets a duty of a PWM signal, reflecting an error detected by the error detection circuit,
wherein the error detection circuit uses the current instruction value which differs between the first operation mode and the second operation mode, and
wherein the PWM modulation circuit controls, in the first operation mode, a ratio of a period of controlling all the low-side transistors of three phases to be into ON state and a period of controlling all of them to be into an OFF state, in a PWM cycle, based on the duty from the compensator.

7. The motor driving device according to claim 6, wherein the PWM modulation circuit uses the PWM cycle with different lengths between the first operation mode and the second operation mode.

8. The motor driving device according to claim 6, wherein the compensator uses control gains which differ in values between the first operation mode and the second operation mode.

9. The motor driving device according to claim 6, further comprising:
a power supply switch which connects an external power supply voltage to the high potential-side power supply voltage in a conductive state, and disconnects the high potential-side power supply voltage from the external power supply voltage in an insulating state, and
a power supply monitor circuit which monitors the external power supply voltage, and controls the power supply switch into the insulating state, when power interruption of the external power supply voltage is detected.

10. The motor driving device according to claim 9, further comprising
clamp circuits of three phases which monitor a voltage of the motor driving node of a corresponding phase, and control the low-side transistor of the corresponding phase to be into an ON state, when the voltage gets greater than a first judgment voltage.

11. The motor driving device according to claim 10, further comprising
a temperature monitor circuit which monitors a temperature of the low-side transistors of three phases, issues an instruction for interrupting the brake mode to the PWM modulation circuit, when the temperature gets greater than a predetermined first judgment temperature, and issues an instruction for restarting the brake mode to the PWM modulation circuit, when it gets lower than a predetermined second judgment temperature.

12. The motor driving device according to claim 9, wherein the power supply monitor circuit monitors the high potential-side power supply voltage, issues an instruction for interrupting the brake mode to the PWM modulation circuit, when the voltage gets grater than a predetermined judgment voltage, and issues an instruction for restarting the brake mode to the PWM modulation circuit, when it gets lower than a predetermined third judgment voltage.

13. A motor system comprising:
a disk which stores data;
a three-phase motor which rotates the disk; and
a motor driving device which drives the three-phase motor,
wherein the motor driving device includes
drivers of three phases which include high-side transistors of three phases which are coupled between a high potential-side power supply voltage and motor driving nodes of three phases and low-side transistors of three phases which are coupled between a low potential-side power supply voltage and the motor driving nodes of three phases,
current sense circuits of three phases which detect magnitude of a current flowing through the low-side transistors of three phases, and output a current detection result to a current detection node which is commonly provided to the three phases,
sense-phase control circuits of three phases, and
a PWM (Pulse Width Modulation) modulation circuit which controls the drivers of three phases and controls the current sense circuits of three phases,
wherein each of the current sense circuits of three phases has
a first transistor which is coupled between the motor driving node of a corresponding phase and the current detection node,
a second transistor which is coupled between the current detection node and the low potential-side power supply voltage, and is fixed into an ON state, and
third transistors which are coupled between the current detection node and the low potential-side power supply voltage,
wherein, in a first operation mode for causing a brake current to flow through the drivers of three phases, when a direction from the motor driving node to the low potential-side power supply voltage is assumed as a first direction, the sense-phase control circuits of three phases control the first transistor of a phase in which the brake current flows in the first direction to be in an ON state, and control the first transistor of a phase in which it flows in a second direction opposite to the first direction to be into an OFF state,
wherein the PWM modulation circuit executes, in the first operation mode,
a first process for controlling all the low-side transistors of three phases to be in an ON state and
a second process for controlling, in a period in which the brake current flows in the first direction in one phase, only the third transistor of the one phase of the third transistors of three phases, and controlling, in a period in which it flows in the first direction in two phases, the third transistors of three phases all to be into an OFF state.

14. The motor system according to claim 13, wherein the PWM modulation circuit, in a second operation mode of causing a driving current to flow through the drivers of three phases, executes
a third process for controlling the high-side transistors of three phases and the low-side transistors of three phases, using a PWM signal, and
a fourth process for, in a period in which the driving current flows in the first direction in one phase, controlling only the third transistor of the one phase of the third transistors of three phases to be into an ON state, and in a period in which it flows in the first direction in two periods, controlling the third transistors of three phases all to be into an OFF state, and wherein the sense-phase control circuits of three phases controls the first transistors of three phases using a same PWM signal as that for the low-side transistors of three phases, in the second operation mode.

15. The motor system according to claim 13, wherein the first transistor is configured with a plurality of transistors coupled in series, and wherein the third transistor is configured with a same number of transistors as that of the first transistor, and coupled in series.

16. The motor system according to claim 14, wherein the motor driving device further includes an error detection circuit which detects an error between the current detection result output to the current detection node and a predetermined current instruction value, and a compensator which includes an integrator, and determines a duty of a PWM signal, reflecting the error detected by the error detection circuit, wherein the error detection circuit uses the current instruction value which differs between the first operation mode and the second operation mode, and wherein the PWM modulation circuit, in the first operation mode, controls a ratio of a period of controlling all the low-side transistors of three phases to be into an ON state and a period of controlling them to be into an OFF state, in a PWM cycle, based on the duty from the compensator.

17. The motor system according to claim 16, further comprising:

a head which reads data stored on the disk; and a voice coil motor which controls a position of the head, wherein the motor driving device further includes a power supply switch which connects an external power supply voltage to the high potential-side power supply voltage in a conductive state, and disconnects the high potential-side power supply voltage from the external power supply voltage in an insulating state, a power supply monitor circuit which monitors the external power supply voltage, and controls the power supply switch to be in the insulating state, when power interruption of the external power supply voltage is detected, and a voice coil motor driver to which the high potential-side power supply voltage is supplied, and drives the voice coil motor.

18. The motor system according to claim 17, wherein the motor driving device further includes clamp circuits of three phases, which monitor a voltage of the motor driving node of a corresponding phase, and control the low-side transistor of the corresponding phase, when this voltage gets greater than a predetermined first judgment voltage.

19. The motor system according to claim 18, wherein the motor driving device further includes a temperature monitor circuit which monitors a temperature of the low-side transistors of three phases, issues an instruction for interrupting the brake mode to the PWM modulation circuit, when this temperature gets greater than a predetermined first judgment temperature, and issues an instruction for restarting the brake mode to the PWM modulation circuit, when it gets lower than a predetermined second judgment temperature.

20. The motor system according to claim 17, wherein the power supply monitor circuit further monitors the high potential-side power supply voltage, issues an instruction for interrupting the brake mode to the PWM modulation circuit, when this voltage gets greater than a predetermined second judgment voltage, and issues an instruction for restarting the brake mode to the PWM modulation circuit, when it gets lower than a predetermined third judgment voltage.

* * * * *